(12) United States Patent
Kemmochi

(10) Patent No.: US 11,394,655 B2
(45) Date of Patent: Jul. 19, 2022

(54) TRANSMISSION UNIT, TRANSMISSION METHOD, RECEPTION UNIT, RECEPTION METHOD, AND PROGRAM

(71) Applicant: Sony Corporation, Tokyo (JP)

(72) Inventor: Chisato Kemmochi, Kanagawa (JP)

(73) Assignee: Sony Corporation, Tokyo (JP)

( * ) Notice: Subject to any disclaimer, the term of this patent is extended or adjusted under 35 U.S.C. 154(b) by 49 days.

(21) Appl. No.: 16/630,907

(22) PCT Filed: Jul. 6, 2018

(86) PCT No.: PCT/JP2018/025657
§ 371 (c)(1),
(2) Date: Jan. 14, 2020

(87) PCT Pub. No.: WO2019/017218
PCT Pub. Date: Jan. 24, 2019

(65) Prior Publication Data
US 2020/0274817 A1 Aug. 27, 2020

(30) Foreign Application Priority Data
Jul. 21, 2017 (JP) .............................. JP2017-141480

(51) Int. Cl.
*H04L 12/835* (2013.01)
*H04L 47/30* (2022.01)
(Continued)

(52) U.S. Cl.
CPC .............. *H04L 47/30* (2013.01); *H04L 13/08* (2013.01); *H04L 47/32* (2013.01); *H04L 47/56* (2013.01); *H04W 4/80* (2018.02)

(58) Field of Classification Search
CPC ......... H04L 47/10; H04L 47/18; H04L 47/24; H04L 47/2408; H04L 47/2441;
(Continued)

(56) References Cited

U.S. PATENT DOCUMENTS 6,775,707 B1 * 8/2004 Bennett ................. H04L 1/1685
709/233
6,862,298 B1 * 3/2005 Smith .................... H04J 3/0632
370/235
(Continued)

FOREIGN PATENT DOCUMENTS

CN 101174918 A 5/2008
CN 102984091 A 3/2013
(Continued)

OTHER PUBLICATIONS

International Search Report and Written Opinion and English translations thereof dated Aug. 28, 2018 in connection with International Application No. PCT/JP2018/025657.
(Continued)

*Primary Examiner* — Kevin D Mew
(74) *Attorney, Agent, or Firm* — Wolf, Greenfield & Sacks, P.C.

(57) ABSTRACT

The present technology relates to a transmission unit, a transmission method, a reception unit, a reception method, and a program that make it possible to easily switch delay time.

The transmission unit transmits, by wireless communication, data control information for controlling a usage of data in the reception unit receiving data transmitted by wireless communication, delay control information indicating a delay mode regarding delay time when the data is processed in the reception unit, and data. The reception unit receives the data transmitted by the wireless communication, the data control information, and the delay control information, controls the usage of the data in accordance with the data control information and the delay control information, and outputs data with the usage being controlled. The technology is applicable to, for example, a wireless communication sys-
(Continued)

tem, etc. where transmission and reception of acoustics are performed by wireless communication such as Bluetooth (registered trademark).

14 Claims, 12 Drawing Sheets

(51) Int. Cl.
  *H04W 4/80* (2018.01)
  *H04L 13/08* (2006.01)
  *H04L 47/32* (2022.01)
  *H04L 47/56* (2022.01)

(58) Field of Classification Search
  CPC ....... H04L 47/28; H04L 47/283; H04L 47/29; H04L 47/30; H04L 47/31; H04L 47/32; H04L 47/38; H04L 47/56; H04L 13/08; H04W 4/80
  See application file for complete search history.

(56) References Cited

U.S. PATENT DOCUMENTS

| | | | | |
|---|---|---|---|---|
| 6,922,396 B1* | 7/2005 | Knappe | ............... | H04L 47/10 370/252 |
| 7,170,856 B1* | 1/2007 | Ho | ................... | H04L 29/06027 370/230 |
| 7,171,552 B1* | 1/2007 | Bell | ................... | H04L 9/12 713/150 |
| 7,454,457 B1* | 11/2008 | Lowery | ............... | H04L 43/0852 709/224 |
| 7,965,638 B1* | 6/2011 | Schzukin | ............... | H04L 47/10 370/235.1 |
| 10,587,536 B1* | 3/2020 | Kwan | ................... | H04L 47/326 |
| 10,868,768 B1* | 12/2020 | Matthews | ................ | H04L 47/22 |
| 2002/0089931 A1* | 7/2002 | Takada | ................... | H04L 47/54 370/232 |
| 2002/0089959 A1* | 7/2002 | Fischer | ................... | H04L 1/16 370/338 |
| 2003/0202528 A1* | 10/2003 | Eckberg | ................. | H04L 47/32 370/412 |
| 2004/0001477 A1* | 1/2004 | D'Amico | .......... | H04L 29/06027 370/352 |
| 2005/0058149 A1* | 3/2005 | Howe | ................ | H04L 47/2416 370/428 |
| 2006/0101153 A1* | 5/2006 | Boucher | ................. | H04L 29/06 709/232 |
| 2006/0126713 A1* | 6/2006 | Chou | ............... | H04N 21/23406 375/225 |
| 2008/0293413 A1* | 11/2008 | Sharif-Ahmadi | ........................... | H04W 28/0273 455/435.1 |
| 2009/0003383 A1* | 1/2009 | Watanabe | ............. | H04W 28/06 370/474 |
| 2009/0077263 A1* | 3/2009 | Koganti | .................. | G06F 16/27 709/248 |
| 2009/0213745 A1* | 8/2009 | Yoshida | .................. | H04L 47/32 370/252 |
| 2010/0034332 A1* | 2/2010 | Enstrom | ................. | H04L 47/30 375/371 |
| 2010/0067438 A1* | 3/2010 | Nakaoka | ............... | H04W 12/08 370/328 |
| 2010/0091785 A1* | 4/2010 | Monzawa | ............... | H04L 47/10 370/412 |
| 2011/0128853 A1* | 6/2011 | Nishimura | .............. | H04L 47/22 370/235 |
| 2014/0082146 A1* | 3/2014 | Bao | .................. | H04N 21/44004 709/219 |
| 2016/0150473 A1 | 5/2016 | Katayama | | |
| 2018/0219789 A1* | 8/2018 | Chaudhuri | ............. | H04L 47/32 |
| 2018/0288650 A1 | 10/2018 | Suzuki et al. | | |
| 2021/0194818 A1* | 6/2021 | So | .......... | H04L 43/087 |

FOREIGN PATENT DOCUMENTS

| | | |
|---|---|---|
| EP | 2 424 159 A1 | 2/2012 |
| EP | 3 229 443 A1 | 10/2017 |
| EP | 3 629 558 A1 | 4/2020 |
| JP | 10-23067 A | 1/1998 |
| JP | 2010-141581 A | 6/2010 |
| JP | 2011066842 A | 3/2011 |
| RU | 2014150793 A | 7/2016 |
| WO | WO 2016/088582 A1 | 6/2016 |

OTHER PUBLICATIONS

International Preliminary Report on Patentability dated Jan. 30, 2020 in connection with International Application No. PCT/JP2018/025657, and English translation thereof.

Extended European Search Report dated Mar. 31, 2020 in connection with European Application No. 18834459.2.

European Communication pursuant to article 94(3) EPC dated Feb. 5, 2021 in connection with European Application No. 18 834 459.2.

\* cited by examiner

[FIG. 1]
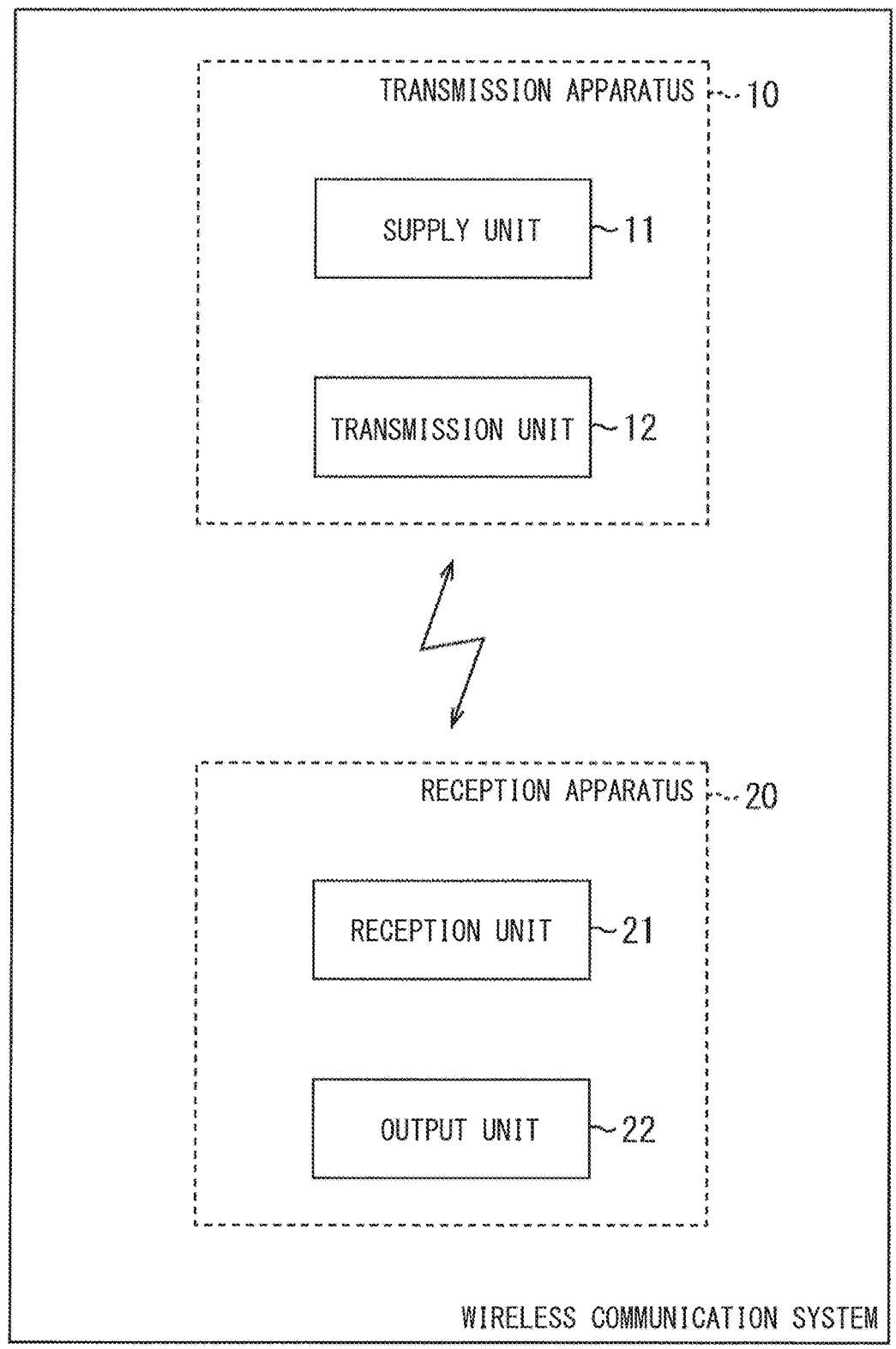

[FIG. 2]
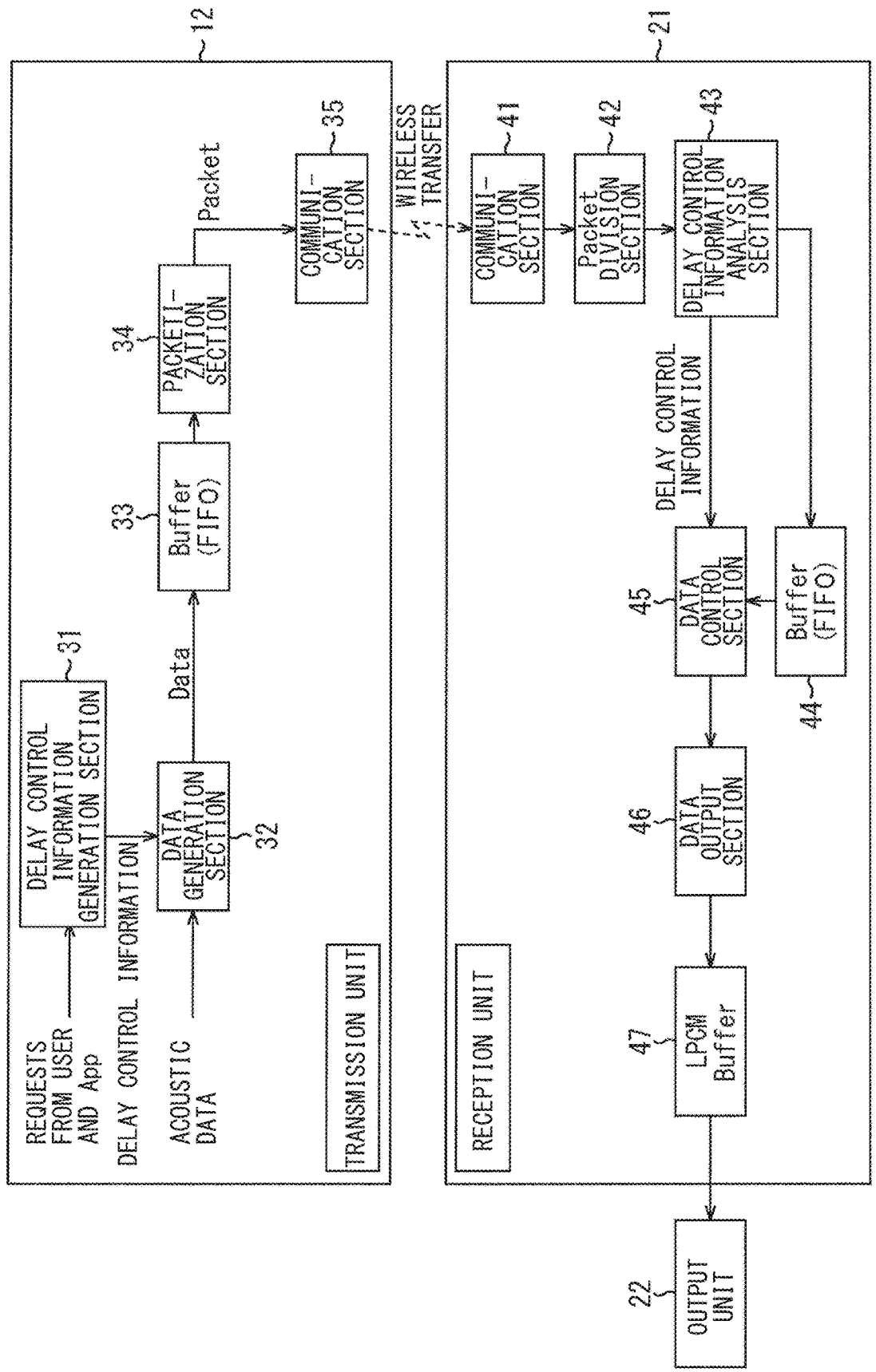

[ FIG. 3 ]
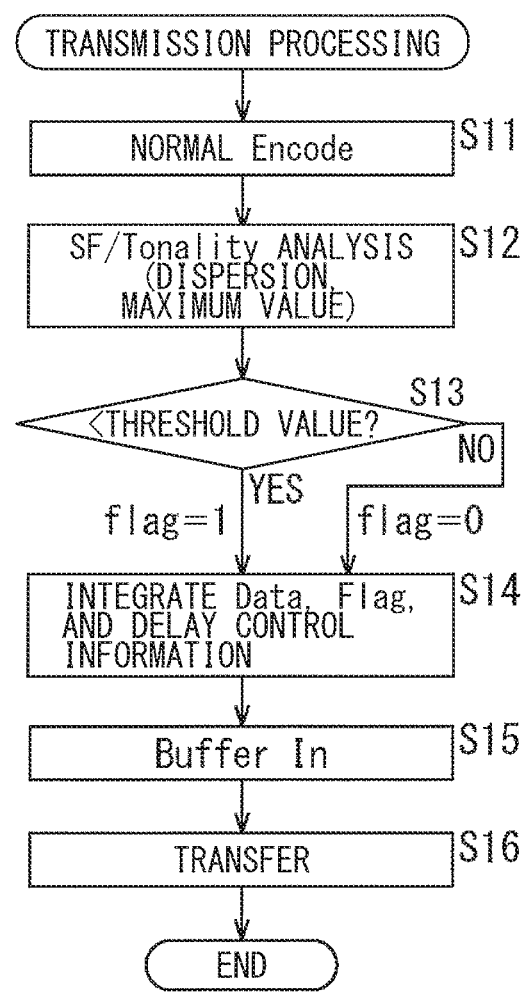

[FIG. 4]
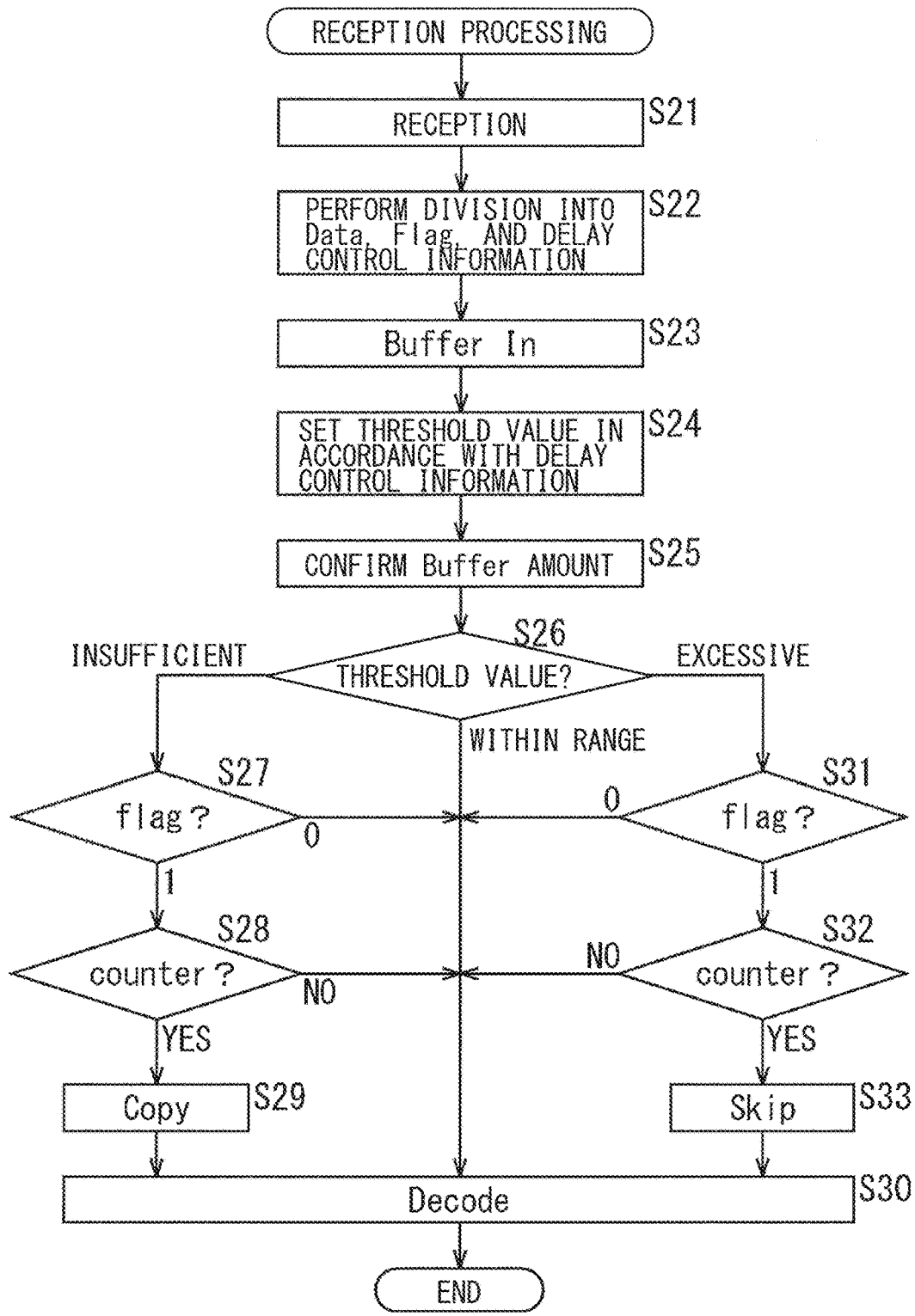

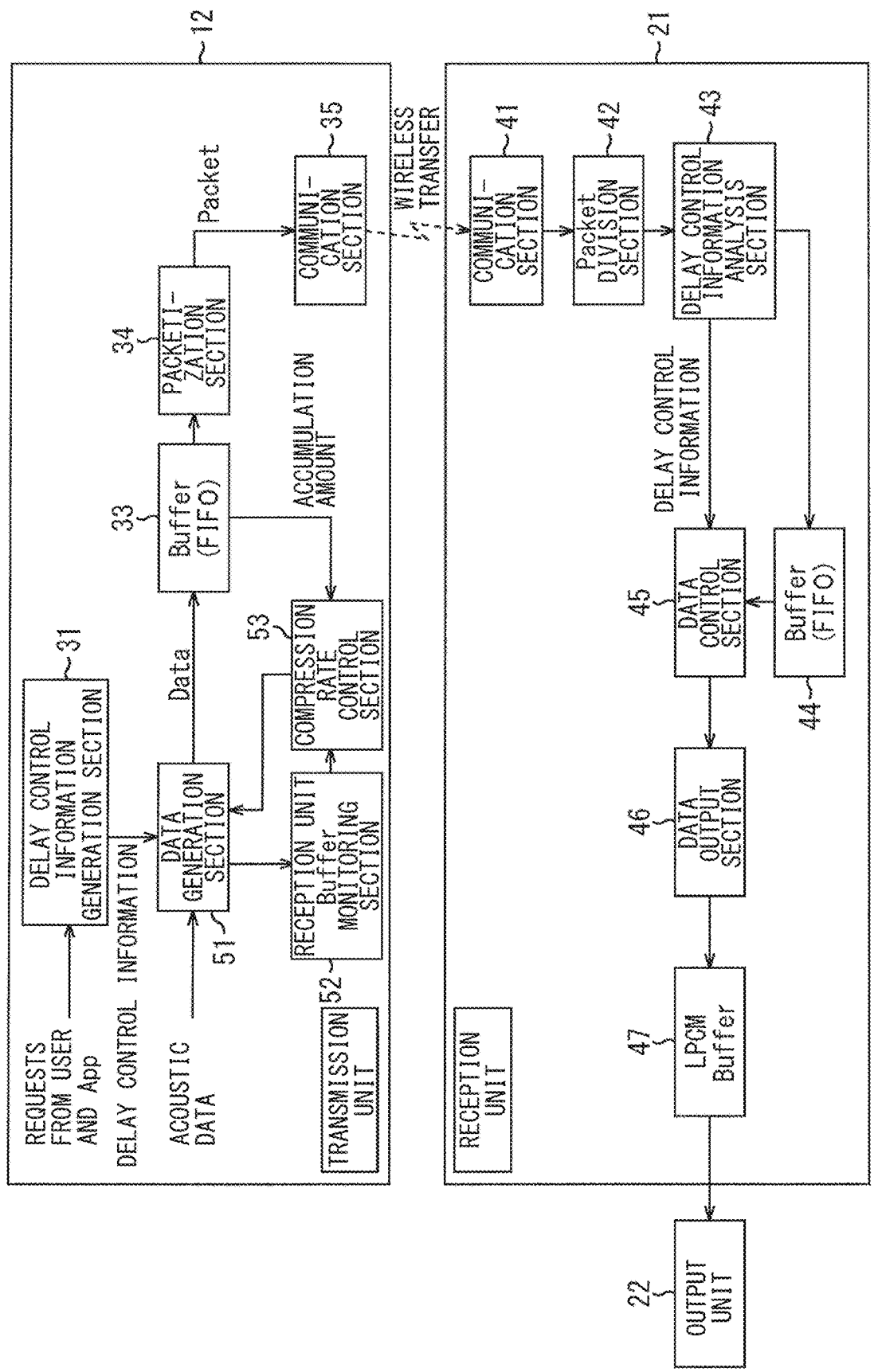
[FIG.5]

[FIG. 6]
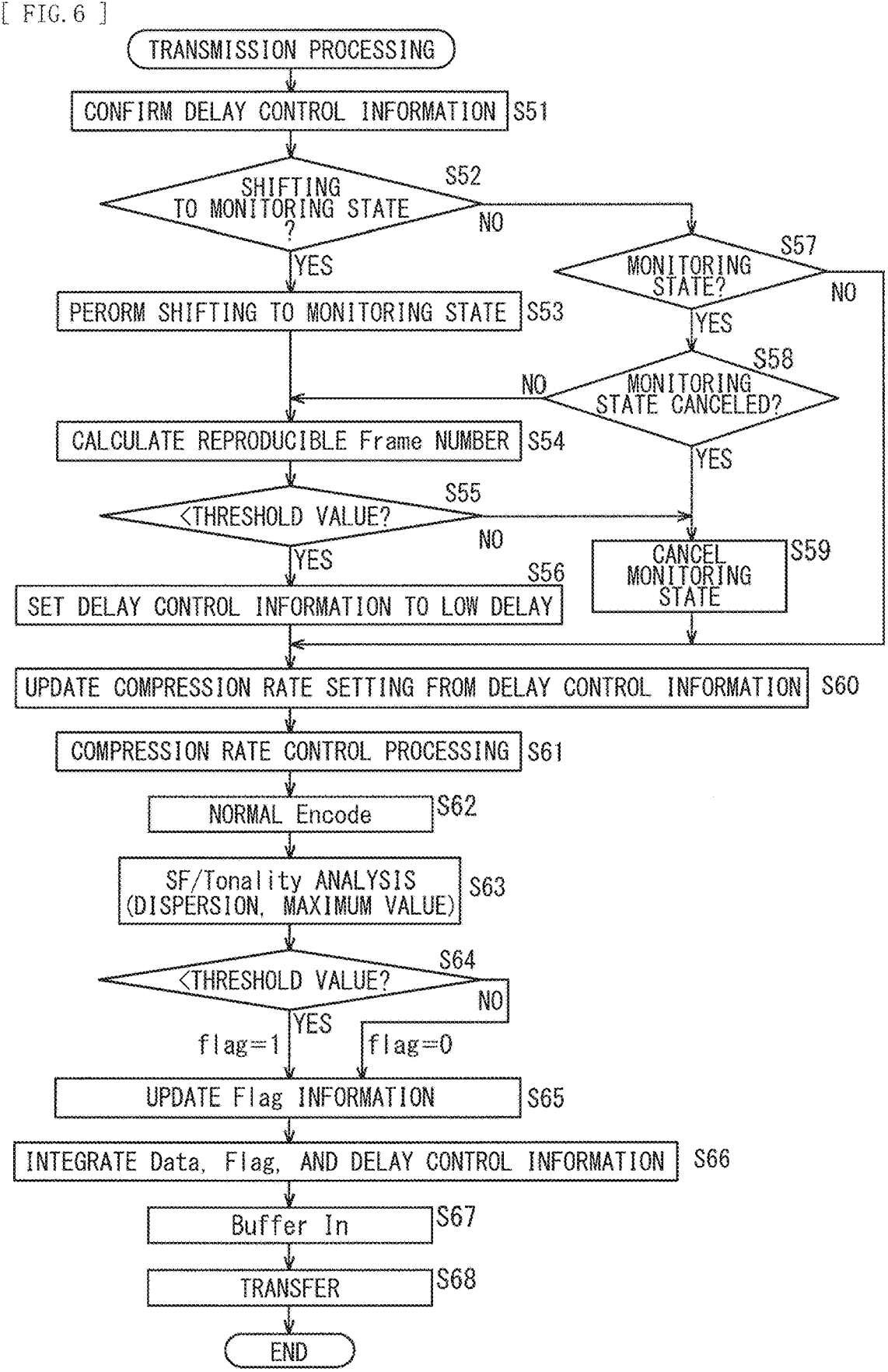

[FIG. 7]
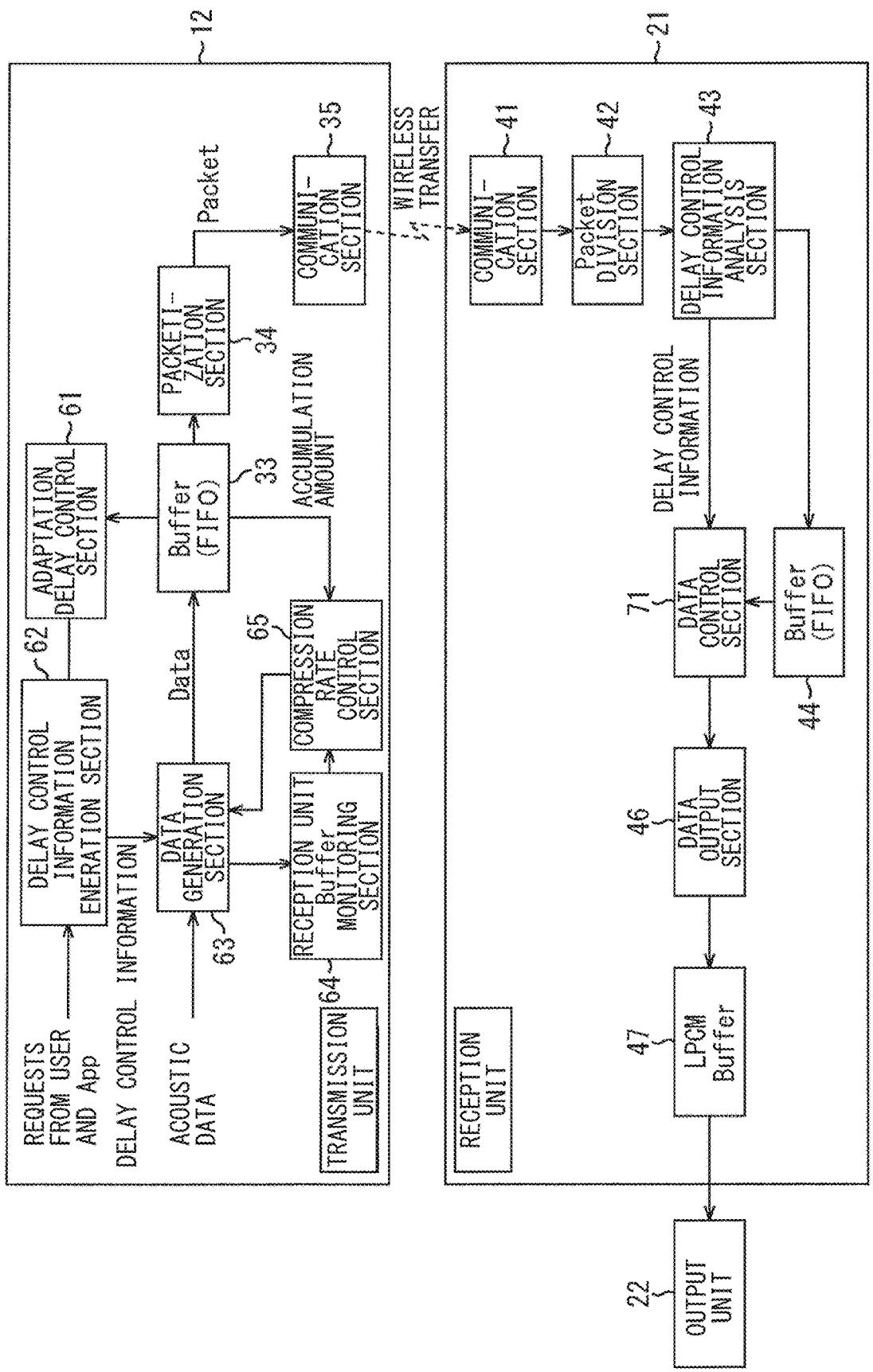

[FIG. 8]
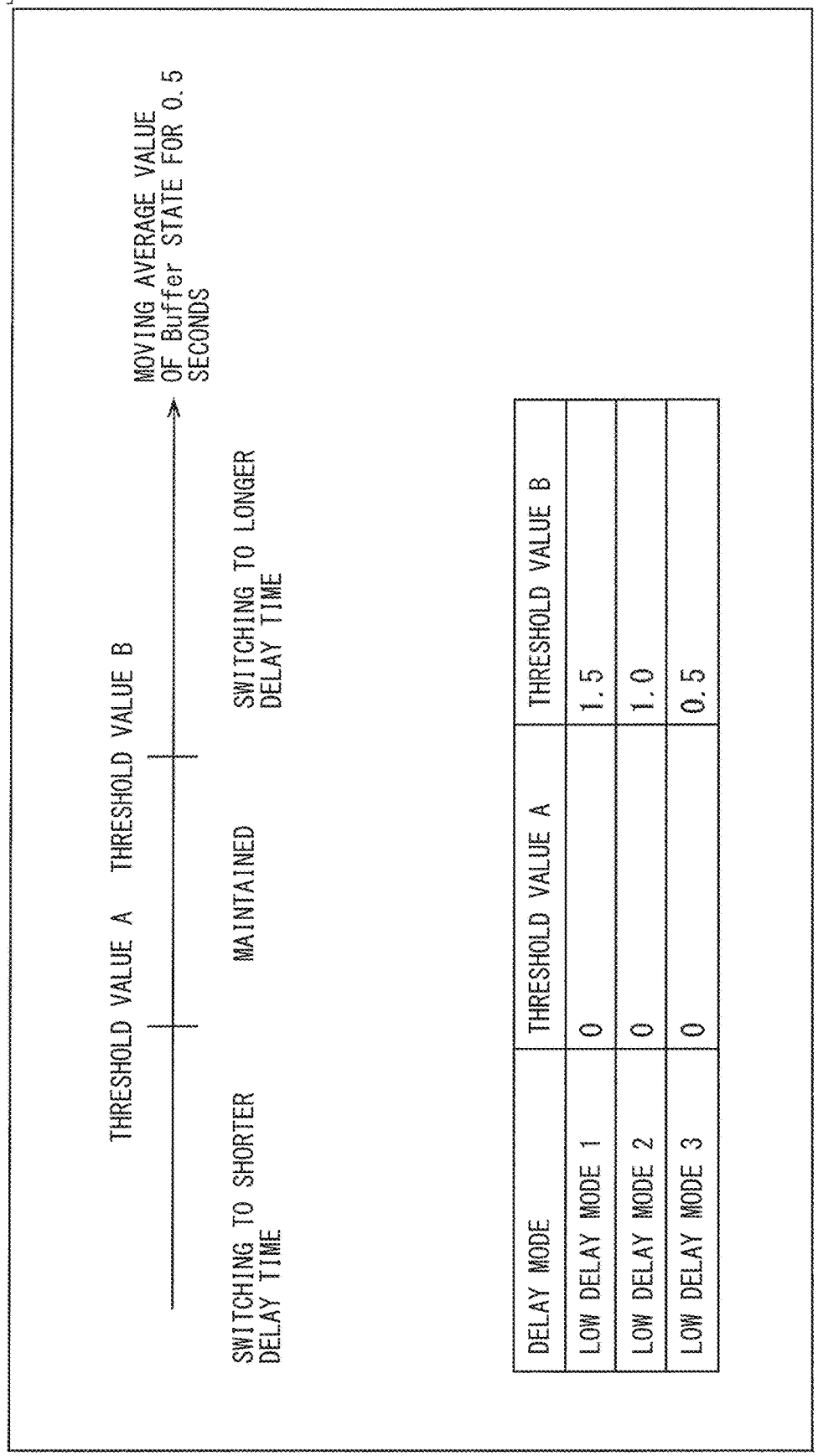

[FIG. 9]
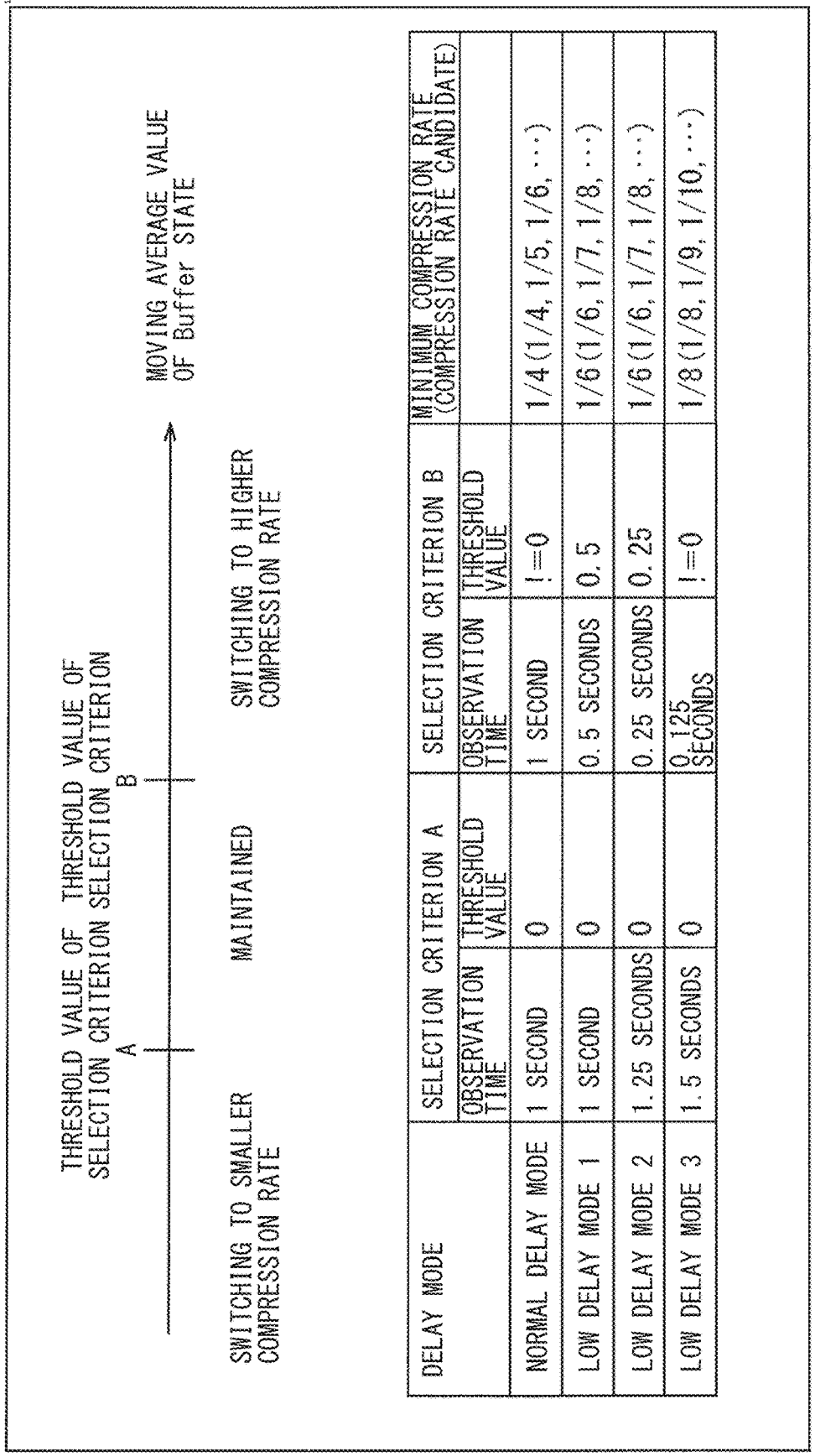

[FIG. 10]
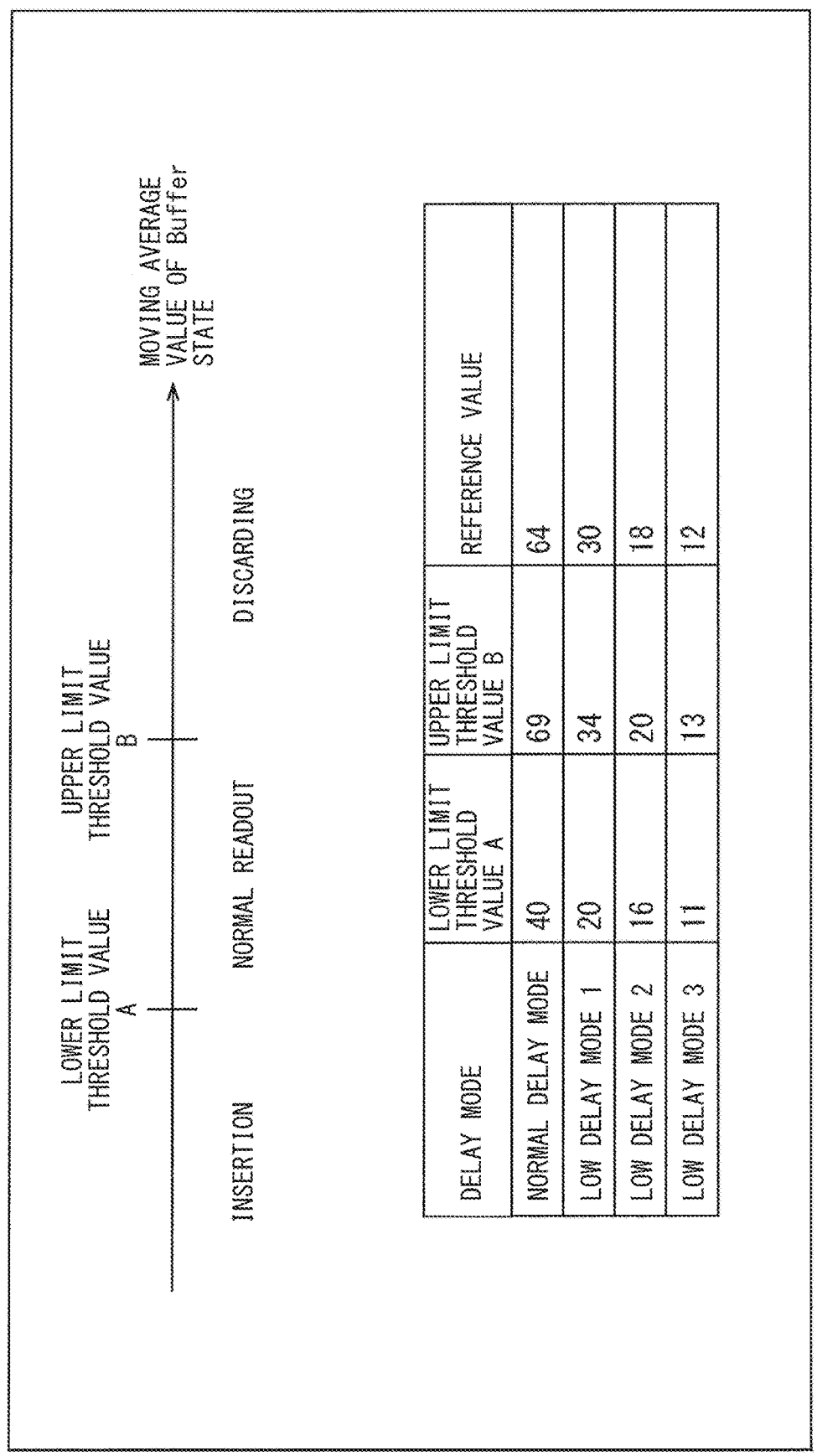

[FIG. 11]
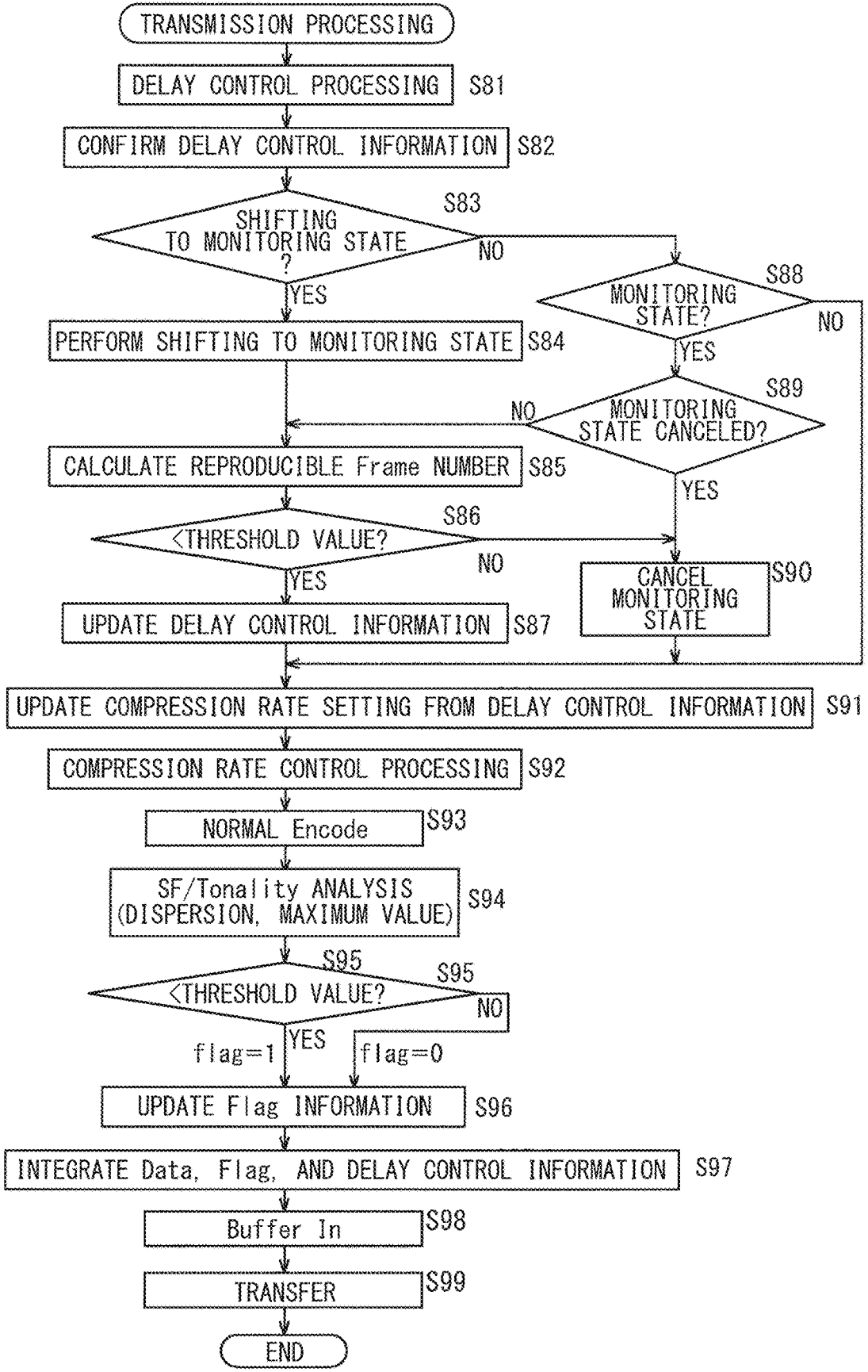

[ FIG. 12 ]
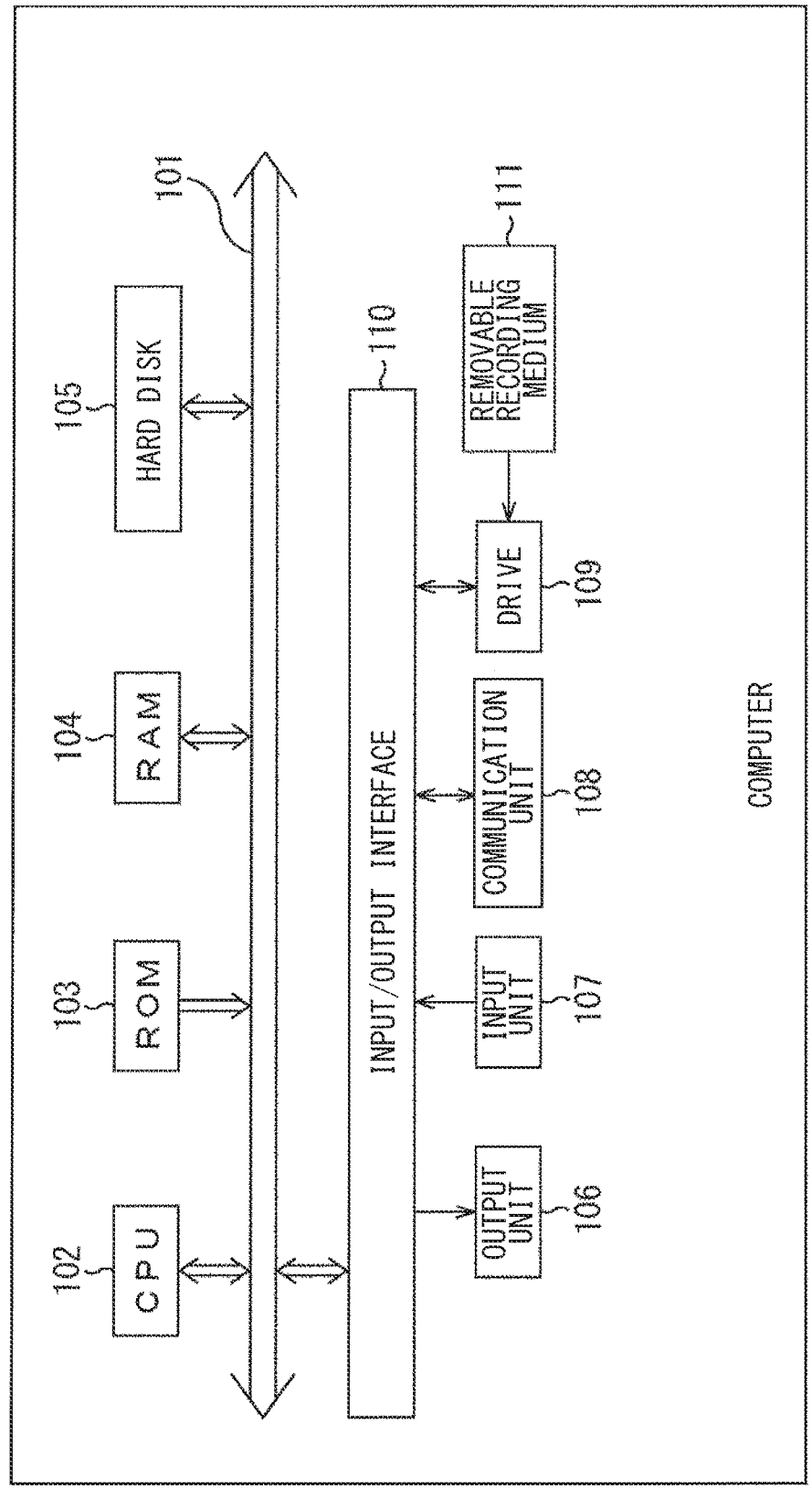

TRANSMISSION UNIT, TRANSMISSION METHOD, RECEPTION UNIT, RECEPTION METHOD, AND PROGRAM

CROSS-REFERENCE TO RELATED APPLICATIONS

This application claims the benefit under 35 U.S.C. § 371 as a U.S. National Stage Entry of International Application No. PCT/JP2018/025657, filed in the Japanese Patent Office as a Receiving Office on Jul. 6, 2018, which claims priority to Japanese Patent Application Number JP2017-141480, filed in the Japanese Patent Office on Jul. 21, 2017, each of which is hereby incorporated by reference in its entirety.

TECHNICAL FIELD

The present technology relates to a transmission unit, a transmission method, a reception unit, a reception method, and a program, and more particularly, to a transmission unit, a transmission method, a reception unit, a reception method, and a program that make it possible to easily perform switching of delay time, for example.

BACKGROUND ART

For example, a wireless communication system utilizing, for example, Bluetooth (registered trademark) is known as a wireless communication system that transfers contents such as images and acoustics from a transmission apparatus to a reception apparatus by wireless communication and reproduces the contents in real time using the reception apparatus.

In such a wireless communication system, in order to stably reproduce the contents, the reception apparatus does not immediately reproduce the data even when the reception apparatus receives data of the contents, but performs reproduction after buffering the data by a predetermined amount (or more) in a buffer. For this reason, in the reception apparatus, a delay occurs at a reproduction start timing at which reproduction is started, as compared with a case where reproduction is performed by the transmission apparatus. In a wireless communication system, time of the delay caused by such a reception apparatus is also referred to as delay time hereinafter.

For example, in a case where an image constituting a content is viewed by a transmission apparatus, and an acoustic constituting the content is transmitted from a transmission apparatus to a reception apparatus by wireless communication to be reproduced by the reception apparatus, the delay time of the reception apparatus causes out-of-sync in which images and acoustics viewed and listened to by a user are out of synchronization with each other. It is desirable to suppress the out-of-sync as much as possible because the user is made to feel a sense of discomfort.

It is to be noted that, there has been proposed, in the wireless communication system, a technique for suppressing occurrence of sound interruption in a reception apparatus in a case of transmitting acoustics from the transmission apparatus to the reception apparatus.

CITATION LIST

Patent Literature

PTL 1: International Publication No. WO2016/088582

SUMMARY OF THE INVENTION

Problems to be Solved by the Invention

As a method of suppressing the out-of-sync, a method of reducing an amount of buffering in which data is buffered by a reception apparatus and shortening delay time is conceivable.

However, when the buffering amount is reduced, in a case where a condition of a transmission path between a transmission apparatus and a reception apparatus is not favorable, communication between the transmission apparatus and the reception apparatus becomes unstable, making it unable to secure time for retransmission when a communication error occurs, thus sometimes causing sound interruption in the reception apparatus.

Therefore, in a use case where the delay time is not problematic, i.e., for example, in a case where a music is only listened to, the buffering amount in the reception apparatus is set to be large. In a use case where the delay time is problematic, i.e., for example, in a case where an image is viewed by the transmission apparatus, and an acoustic accompanying the image is transferred to the reception apparatus by wireless communication to be listened to, there is a method of switching the delay time, in which the buffering amount of the reception apparatus is set to be small.

However, in a case where the delay time, i.e., the buffering amount in the reception apparatus is switched, it is necessary to disconnect coupling (wireless communication) between the transmission apparatus and the reception apparatus once, clear the buffer of the reception apparatus, and then couple the transmission apparatus and the reception apparatus to each other again, which is troublesome.

The present technology has been made in view of such circumstances, and makes it easier to perform switching of delay time.

Means for Solving the Problem

A reception unit or a first program of the present technology is a reception unit including: a reception section that receives data transmitted by wireless communication, data control information for controlling of a usage of the data, and delay control information indicating a delay mode regarding delay time when the data is processed; a data control section that controls the usage of the data in accordance with the data control information and the delay control information; and a data output section that outputs data of which the usage is controlled, or a program that causes a computer to serve as such a reception unit.

A reception method of the present technology is a reception method including: receiving data transmitted by wireless communication, data control information for controlling of a usage of the data, and delay control information indicating a delay mode regarding delay time when the data is processed; controlling the usage of the data in accordance with the data control information and the delay control information; and outputting data of which the usage is controlled.

In the reception unit, the reception method, and the first program of the present technology, the data transmitted by wireless communication, the data control information for controlling of the usage of the data, and the delay control information indicating the delay mode regarding the delay time when the data is processed are received, and the usage of the data is controlled in accordance with the data control information and the delay control information. Then, the data of which the usage is controlled is outputted.

A transmission unit or a second program of the present technology is a transmission unit including: a data control information generation section that generates data control information for controlling of a usage of data transmitted by wireless communication in a reception unit that receives the data; a delay control information generation section that generates delay control information indicating a delay mode regarding delay time when the data is processed in the reception unit; and a transmission section that transmits the data, the data control information, and the delay control information by wireless communication, or a program that causes a computer to serve as such a transmission unit.

A transmission method of the present technology is a transmission method including: generating data control information for controlling of a usage of data in a reception unit that receives the data transmitted by wireless communication; generating delay control information indicating a delay mode regarding delay time when the data is processed in the reception unit; and transmitting the data, the data control information, and the delay control information by wireless communication.

In the transmission unit, the transmitting method, and the second program of the present technology, the data control information is generated for controlling of the usage of the data in the reception unit that receives the data transmitted by wireless communication, and the delay control information is generated indicating the delay mode regarding the delay time when the data is processed in the reception unit. Then, the data, the data control information, and the delay control information are transmitted by wireless communication.

It is to be noted that the reception unit and the transmission unit may be independent units, or may be inner blocks constituting one apparatus.

In addition, the first and second programs may be provided by being recorded in a recording medium or by being transferred via a transfer medium.

Effect of Invention

According to the present technology, it is possible to easily perform switching of the delay time the delay time can be easily switched.

It is to be noted that the effects described herein are not necessarily limited and may be any of the effects described in the present disclosure.

BRIEF DESCRIPTION OF THE DRAWINGS

FIG. 1 is a block diagram illustrating a configuration example of an embodiment of a wireless communication system to which the present technology is applied.

FIG. 2 is a block diagram illustrating a first configuration example of a transmission unit 12 and a reception unit 21.

FIG. 3 is a flow chart describing an example of transmission processing performed by the transmission unit 12 for transmitting acoustic data.

FIG. 4 is a flow chart describing an example of reception processing performed by the reception unit 21 for receiving acoustic data.

FIG. 5 is a block diagram illustrating a second configuration example of the transmission unit 12 and the reception unit 21.

FIG. 6 is a flow chart describing an example of transmission processing performed by the transmission unit 12 for transmitting acoustic data.

FIG. 7 is a block diagram illustrating a third configuration example of the transmission unit 12 and the reception unit 21.

FIG. 8 describes an example of processing of an adaptation delay control section 61.

FIG. 9 describes an example of processing of a compression rate control section 65.

FIG. 10 describes an example of processing of a data control section 71.

FIG. 11 is a flow chart describing an example of transmission processing performed by the transmission unit 12 for transmitting acoustic data.

FIG. 12 is a block diagram illustrating a configuration example of an embodiment of a computer to which the present technology is applied.

MODES FOR CARRYING OUT THE INVENTION

<Embodiment of Wireless Communication System to which Present Technology is Applied>

FIG. 1 is a block diagram illustrating a configuration example of an embodiment of a wireless communication system to which the present technology is applied.

In FIG. 1, the wireless communication system includes a transmission apparatus 10 and a reception apparatus 20.

The transmission apparatus 10 includes a supply unit 11 and a transmission unit 12.

The supply unit 11 supplies, for example, image data and acoustic data of a content, which are data to be transmitted by wireless communication, to the transmission unit 12. It is possible to adopt, as the supply unit 11, for example, a portable apparatus (e.g., a mobile phone, a smartphone, a portable music player, etc.) for reproducing image data or acoustic data, or a stationary apparatus (e.g., a stationary music player, a PC (Personal Computer), etc.).

The transmission unit 12 performs wireless communication with a reception unit 21, and wirelessly transmits acoustic data and the like supplied from the supply unit 11 to the reception unit 21.

It is to be noted that the supply unit 11 and the transmission unit 12 may be configured as one apparatus (transmission apparatus 10) housed in one housing, or may be configured as separate units housed in separate housings.

The reception apparatus 20 includes the reception unit 21 and an output unit 22.

The reception unit 21 performs wireless communication with the transmission unit 12, receives image data, acoustic data, and the like transmitted by wireless communication from the transmission unit 12, and supplies the image data, acoustic data, and the like to the output unit 22.

The output unit 22 outputs an image or an acoustic corresponding to the image data or the acoustic data supplied from the reception unit 21. It is possible to adopt, as the output unit 22, for example, a display that converts an image corresponding to image data which is an electric signal into an image (light) which is visually recognized, a headphone (including an earphone) that converts acoustic data which is an electric signal into an acoustic which is able to be auditorily recognized, and a speaker (including a unit such as a TV (television receiver) with a built-in speaker, etc.).

It is to be noted that the reception unit 21 and the output unit 22 may be configured as one apparatus (reception apparatus 20) housed in one housing, or may be configured as separate apparatuses housed in separate housings.

In the wireless communication system configured as described above, in the transmission apparatus 10, the supply unit 11 supplies acoustic data to the transmission unit 12. The transmission unit 12 transmits the acoustic data from the supply unit 11 to the reception unit 21 by wireless communication.

In the reception apparatus 20, the reception unit 21 receives the acoustic data transmitted by wireless communication from the transmission unit 12, and supplies the acoustic data to the output unit 22. The output unit 22 outputs an acoustic corresponding to the acoustic data from the reception unit 21.

Hereinafter, description is given in detail of the transmission unit 12 and the reception unit 21 by taking an example of a case where the transmission and reception (transfer) of acoustic data by utilizing, for example, Bluetooth (registered trademark) as wireless communication between the transmission unit 12 and the reception unit 21.

It is to be noted that it is possible to adopt, as the wireless communication between the transmission unit 12 and the reception unit 21, a communication method other than Bluetooth (registered trademark). In addition, it is possible to adopt, as data to be transmitted and received between the transmission unit 12 and the reception unit 21, data other than acoustic data, i.e., data of a content such as image data, for example.

In Bluetooth (registered trademark), the transmission unit 12 transmitting acoustic data is called a source (source), and the reception unit 21 receiving acoustic data is called a sink (sink).

Bluetooth (registered trademark) defines, for example, A2DP (Advanced Audio Distribution Profile), etc. as a profile for transmitting and receiving acoustic data.

A2DP defines an essential codec (Mandatory Codec) called SBC (Subband Codec). In the SBC, LPCM (Linear Pulse Code Modulation) data, which is a type of transform coding method and is acoustic data, is compressed and transmitted from the transmission unit 12 to the reception unit 21.

In the wireless communication system illustrated in FIG. 1, the reception unit 21 includes a built-in buffer, buffers acoustic data transmitted from the transmission unit 12 in the buffer, and then reproduces the acoustic data. The reception unit 21 is able to switch (adjust) a buffering amount (accumulated amount) of the buffer and thus the delay time without disconnecting the coupling with the transmission unit 12 even during reproduction of the acoustic (data), as well as during reproduction of the acoustic (data). That is, it is possible to easily perform the switching of the delay time.

Here, unless otherwise specified, delay modes regarding the delay time of the reception unit 21 are assumed to be two types of modes: a normal delay mode (first delay mode) in which the reproduction of the acoustic data by the reception unit 21 is stabilized, and a low delay mode (second delay mode) in which the delay time is shorter than that of the normal delay mode. Further, as the switching of the delay mode, switching between the normal delay mode and the low delay mode is assumed to be performed.

In the low delay mode, a buffering capacity of the buffer of the reception unit 21 is smaller than that in the normal delay mode.

When the delay in the reception unit 21 is not problematic, i.e., for example, in a case where the reception apparatus 20 is only used to listen to a song or the like as an acoustic, the delay mode is set to the normal delay mode. In addition, in a case where the delay time is problematic, i.e., for example, in a case where an image is viewed on the transmission apparatus 10, and an acoustic accompanying the image is transmitted from the transmission apparatus 10 to the reception apparatus 20 to be listened to on the reception apparatus 20, the delay mode is set to the low delay mode.

The delay mode is set by the transmission unit 12, and delay control information indicating the delay mode is transmitted from the transmission unit 12 to the reception unit 21. In the transmission unit 12, switching (setting) of the delay mode is performed in response to an operation of a user, a request from an application (app), a request from OS (Operating System), and the like.

When the switching of the delay mode is requested, the transmission unit 12 generates delay control information indicating a delay mode after the switching, and transmits the delay control information to the reception unit 21. That is, for example, when a request is made to switch the delay mode from the low delay mode to the normal delay mode, the transmission unit 12 generates delay control information indicating the normal delay mode and transmits the delay control information to the reception unit 21. In addition, for example, when a request is made to switch the delay mode from the normal mode to the low delay mode, the transmission unit 12 generates delay control information indicating the low delay mode, and transmits the delay control information to the reception unit 21.

The reception unit 21 receives the delay control information from the transmission unit 12, and prepares to switch (adjust) the buffering amount in the buffer of the reception unit 21 to allow delay time in the delay mode to be generated in accordance with the delay mode indicated by the delay control information.

That is, the reception unit 21 does not immediately adjust the buffering amount to allow the delay time in the delay mode indicated by the delay control information to be generated, but adjusts the buffering amount when a timing is reached that allows for the adjustment without causing the user who listens to the acoustic to feel a sense of discomfort as much as possible.

It is possible to utilize a technique described in PTL 1, for example, as a buffering amount adjustment method for adjusting the buffering amount without causing the user to feel a sense of discomfort as much as possible.

According to the technique described in PTL 1, in a case where a frame, which is a processing unit of acoustic data, is inserted or discarded on transmission side (source), a sensed feature amount indicating a degree in which insertion or discarding of the frame is sensed is determined for each frame.

Then, in accordance with the sensed feature amount, a flag indicating that insertion or discarding of the frame is permitted or prohibited, and a level indicating degree of permission and prohibition of the insertion or discarding are generated as control information of the frame, and are transmitted from the transmission side to reception side (sink).

For example, in a case where underflow or overflow of the buffer is likely to occur, insertion or discarding of the frame in which the insertion or discarding is permitted is performed on the reception side, in accordance with the buffering amount in the buffer that buffers the acoustic data and with the control information, thus allowing for suppression of sound interruption caused by the underflow or overflow of the buffer without causing the user to feel a sense of discomfort as much as possible.

According to the technique described in PTL 1, the buffering amount in the buffer on the reception side is adjusted to a constant value at which the underflow or overflow of the buffer is less likely to occur by insertion or discarding of a frame.

The wireless communication system illustrated in FIG. 1 utilizes the technique described in PTL 1 to a mechanism of adjusting the buffering amount in the buffer of the reception unit 21 to a buffering amount corresponding to delay time in the low delay mode or delay time in the normal delay mode.

<First Configuration Example of Transmission Unit 12 and Reception Unit 21>

FIG. 2 is a block diagram illustrating a first configuration example of the transmission unit 12 and the reception unit 21 in FIG. 1.

In FIG. 2, the transmission unit 12 includes a delay control information generation section 31, a data generation section 32, a (transmission) buffer 33, a packetization section 34, and a communication section 35.

The delay control information generation section 31 is supplied with requests for switching of the delay mode (delay time) from the outside, i.e., for example, a user, an application (app), OS, and the like.

In response to the request for switching of the delay mode supplied thereto, the delay control information generation section 31 generates delay control information indicating the delay mode regarding the delay time when the reception unit 21 processes the acoustic data, and supplies the delay control information to the data generation section 32.

Here, the delay control information generation section 31 generates delay control information indicating the low delay mode or the normal delay mode, and supplies the delay control information to the data generation section 32.

It is to be noted that it is possible to adopt, as the delay control information, for example, binary information in which the normal delay mode is represented by 0 and the low delay mode is represented by 1.

In addition, in a case where three or more types of delay time are adopted as the delay time, i.e., in a case where five types of delay time are adopted, for example, it is possible to adopt delay modes of the five types of delay time, e.g., the information represented by values 0 to 5, as the delay control information.

Here, to simplify the description, the delay control information generation section 31 generates delay control information indicating one of the two types of modes: the low delay mode and the normal delay mode.

In addition to the delay control information supplied from the delay control information generation section 31, LPCM data, which is acoustic data, is supplied from the supply unit 11 to the data generation section 32.

The data generation section 32 includes, for example, an SBC encoder, and serves as an encoding section that performs encoding for compressing the LPCM data from the supply unit 11 into a data amount of 1/4or less in a unit called a frame such as 64 samples and 128 samples.

In addition, the data generation section 32 serves as a data control information generation section that generates data control information for controlling of a usage of data in the reception unit 21 for the frame of LPCM data corresponding to encoded data.

That is, the data generation section 32 acquires, for the frame of the LPCM data, a sensed feature amount indicating a degree in which the insertion or discarding of the frame is sensed in a case where the insertion or discarding of the frame is performed in the reception unit 21. The sensed feature amount may represent susceptibility to the insertion or discarding of a frame, or may represent insusceptibility to the insertion or discarding of a frame.

In addition, the data generation section 32 generates data control information for the frame on the basis of the sensed feature amount of the frame of the LPCM data.

The sensed feature amount is able to be generated, for example, from a result of processing of the frame of the LPCM data (e.g., frequency component) obtained when the SBC is encoded by the data generation section 32.

In addition, the sensed feature amount is able to be generated, for example, in the data generation section 32, by processing the frame of the LPCM data obtained by the data generation section 32.

It is possible to adopt, as the sensed feature amount, for example, a ratio between the maximum value and the mean value of the frequency components, as a physical amount representing tonality (Tonality) of the LPCM data. In a case where the LPCM data is a tonal acoustic, the tonality is large; in a case where the LPCM data is an acoustic of a noise property, the tonality is small. In a case where the tonality of the LPCM data is small, insertion or discarding of the LPCM data is less likely to be sensed. Thus, even inserting or discarding a frame of the LPCM data with small tonality immediately after the frame has little effect on sound quality when the user listens to the acoustic. It is to be noted that, in the present embodiment, performing the insertion or discarding of the encoded data in which the frame of the LPCM data is encoded, instead of performing the insertion or discarding of the frame itself of the LPCM data, allows the insertion or discarding of the frame corresponding to the encoded data to be substantially performed.

It is possible to adopt, as the sensed feature amount, for example, a variance, etc. of a normalization factor called SF (Scale Factor) resulting from normalization of frequency components of each narrow frequency band, in addition to the tonality.

After acquiring the sensed feature amount of the frame of the LPCM data, the data generation section 32 generates data control information of encoded data (encoded data obtained by encoding the frame) corresponding to the frame of the LPCM data, on the basis of, for example, the magnitude relationship between the sensed feature amount and a predetermined threshold value.

Now, for example, when it is assumed that insertion or discarding of encoded data corresponding to a frame of the LPCM data is less likely sensed as the sensed feature amount of the frame is smaller, the data generation section 32 compares the sensed feature amount of the frame of the LPCM data with a predetermined threshold value, and generates data control information for permitting insertion or discarding of encoded data in the reception unit 21 for encoded data having a sensed feature amount smaller than (or equal to or smaller than) the predetermined threshold value, i.e., for encoded data of which insertion or discarding is less likely sensed.

In addition, the data generation section 32 generates data control information indicating that the insertion and discarding of the encoded data in the reception unit 21 are prohibited for encoded data having a sensed feature amount being equal to or more than a predetermined threshold value (corresponding to a frame), i.e., for encoded data of which insertion or discarding is not considered less likely to be sensed.

It is to be noted that it is possible to widely adopt, as the data control information, information regarding permission or prohibition of insertion or discarding of encoded data.

In other words, it is possible to adopt, as the data control information, for example, a flag of one bit (or more) indicating that insertion or discarding of encoded data is permitted or prohibited.

Further, it is possible to adopt, as the data control information, for example, information indicating a level of permission and prohibition of insertion or discarding of encoded data.

Here, it is possible to adopt, as the information indicating the level of permission and prohibition of insertion or discarding of the encoded data, for example, four levels of permission or prohibition: a complete permission level indicating that insertion or discarding of the encoded data is permitted when it is necessary for prevention of sound interruption; a quasi-permission level indicating that insertion or discarding of the encoded data is permitted in a case where it is highly necessary for prevention of sound interruption; a quasi-prohibition level indicating that insertion or discarding of the encoded data is permitted only in a case where it is absolutely necessary for prevention of sound interruption; and a prohibition level indicating that insertion or discarding of the encoded data is prohibited in any case.

In a case where four levels of the complete permission level, the quasi-permission level, the quasi-prohibition level, and the prohibition level are adopted as the data control information, the data control information is information of two bits (or more).

It is to be noted that it is possible to generate, as the data control information, information regarding insertion of encoded data and information regarding discarding thereof separately, in addition to the information regarding both the insertion and discarding of the encoded data.

In addition, it is also possible to adopt, as the sensed feature amount, a physical amount by which the insertion or discarding of encoded data is less likely to be sensed as the value is smaller, as well as a physical amount by which insertion or discarding of encoded data is less likely to be sensed as the value is larger.

In the following, for simplification of description, a 1-bit flag indicating permission or prohibition of both the insertion and discarding of the encoded data is adopted as the data control information; a physical amount is adopted as the sensed feature amount by which insertion or discarding of the encoded data is less likely to be sensed as the value is smaller.

Here, the insertion or discarding of encoded data is a usage of the encoded data, and therefore the data control information indicating the permission or prohibition of the insertion or discarding of the encoded data may be said to be information for controlling of the usage of the encoded data in the reception unit 21.

The data generation section 32 generates transmission target data in which encoded data obtained by encoding a frame of acoustic data from the supply unit 11, data control information of the frame, and delay control information from the delay control information generation section 31 for the frame are combined as a set, and supplies the transmission target data to the buffer 33.

The buffer 33 is configured by, for example, a FIFO (First in first out) memory, and temporarily stores transmission target data supplied from the data generation section 32.

The encoded data stored in the buffer 33 is read as appropriate and supplied to the packetization section 34.

The packetization section 34 packetizes the transmission target data from the buffer 33 by storing the data in a packet, which is a transmission (transmission and reception) unit, and supplies the packetized data to the communication section 35.

It is to be noted that, in a case where the transmission target data is larger than the packet size (packet payload size), the packetization section 34 divides the transmission target data and stores the divided transmission target data in a plurality of packets, thereby packetizing the transmission target data.

In addition, the packetization section 34 stores a plurality of pieces of transmission target data in one packet depending on the sizes of the packet and the transmission target data.

In the packetization section 34, it is possible to adopt packets of different sizes in accordance with a delay mode indicated by the delay control information constituting the transmission target data. That is, in a case where the delay mode is the normal delay mode, it is possible to adopt a packet of a larger size (than in the case of the low delay mode); in a case where the delay mode is the low delay mode, it is possible to adopt a packet of a smaller size (than in the case of the normal delay mode). In this case, it is possible to shorten transmission (retransmission) time for the packet.

The communication section 35 is a transmission section that modulates a packet from the packetization section 34 into an RF (Radio Frequency) signal and transmits the RF signal by wireless communication.

The reception unit 21 includes a communication section 41, a packet (Packet) division section 42, a delay control information analysis section 43, a buffer 44, a data control section 45, a data output section 46, and an LPCM buffer 47.

The communication section 41 is a reception section that receives an RF signal from the communication section 35, demodulates a base band packet, and supplies the demodulated packet to the packet division section 42.

The packet division section 42 divides the packet from the communication section 41, extracts transmission target data from the packet, and supplies the extracted transmission target data to the delay control information analysis section 43. It is to be noted that the packet division section 42 detects whether or not one piece of transmission target data is divided into a plurality of packets and stored. In a case where it is detected that one piece of transmission target data is divided and stored in a plurality of packet, the packet division section 42 acquires the plurality of packets, reconfigures the original one piece of transmission target data from the plurality of packets, and supplies the reconfigured data to the delay control information analysis section 43.

The delay control information analysis section 43 divides the transmission target data from the packet division section 42 into delay control information, data control information, and encoded data (of a frame). Then, the delay control information analysis section 43 supplies the encoded data to the buffer 44, and supplies the delay control information and the data control information to the data control section 45.

The (reception) buffer 44 is configured by, for example, a FIFO memory, and temporarily stores the encoded data supplied from the packet division section 42.

The data control section 45 controls the usage of the encoded data stored in the buffer 44 in accordance with the delay control information and the data control information from the delay control information analysis section 43 as well as an accumulated amount in the buffer 44 (the number of encoded data stored in the buffer 44 (the number of frames constituting the encoded data)) (buffering amount), and supplies the data output section 46 with the encoded data of which the usage is controlled.

That is, the data control section 45 performs, as the control of the usage of the encoded data, the insertion or discarding of the encoded data stored in the buffer 44 in accordance with the delay control information and the data control information as well as an accumulated amount in the buffer 44.

Here, in the data control section 45, it is possible to perform the insertion of the encoded data by, for example, copying the encoded data in the buffer 44.

It is possible to copy the encoded data stored in the buffer 44 by keeping the encoded data stored in the buffer 44 when the encoded data is read from the buffer 44. Assuming that the encoded data kept stored in the buffer 44 is a copy of the encoded data, the insertion of the encoded data is performed by reading the copy of the encoded data from the buffer 44.

In addition, in the data control section 45, it is possible to perform the discarding of the encoded data by skipping the reading of the encoded data from the buffer 44.

In a case where there is no alteration (change) in the delayed control information from the delay control information analysis section 43, the data control section 45 reads the oldest (the most precedent) encoded data for one frame stored in the buffer 44, and supplies the encoded data to the data output section 46.

In addition, in a case where there is an alteration in the delay control information from the delay control information analysis section 43, the data control section 45 performs the insertion or discarding of the encoded data stored in the buffer 44 in accordance with (the alteration in) the delay control information.

That is, in a case where the delay mode indicated by the delay control information from the delay control information analysis section 43 is changed (altered) from the normal delay mode to the low delay mode, the data control section 45 discards the encoded data stored in the buffer 44 on a frame-by-frame basis in accordance with the data control information of the encoded data, in order to shorten the delay time.

Specifically, in a case where the flag as the data control information of the oldest encoded data stored in the buffer 44 is, for example, 0 that indicates prohibition of both the insertion and discarding of the encoded data, the data control section 45 reads the oldest encoded data stored in the buffer 44 without discarding, and supplies the read data to the data output section 46.

On the other hand, in a case where the flag as the data control information of the oldest encoded data stored in the buffer 44 is, for example, 1 that indicates permission of both the insertion and discarding of the encoded data, the data control section 45 discards the oldest encoded data stored in the buffer 44.

The data control section 45 thereafter repeats similar processing for encoded data that has newly become the oldest encoded data due to discarding of the oldest encoded data, among the encoded data stored in the buffer 44.

For example, in a case where encoded data corresponding to silence continues, the flag as the data control information of encoded data of a plurality of consecutive frames becomes 1, and pieces of the encoded data of the plurality of frames are consecutively discarded.

When the accumulated amount in the buffer 44 is a value close to a reference value of an accumulated amount in the low delay mode (the number of frames for predetermined time as appropriate time as the delay time in the low delay mode) (e.g., 18 frames, etc.) due to the discarding of the encoded data stored in the buffer 44, the data control section 45 controls the reading of the encoded data from the buffer 44 in accordance with a threshold value of the accumulated amount (in the buffer 44) in the low delay mode and with the data control information.

Here, the threshold value of the accumulated amount in the low delay mode is a threshold value representing a range, and has two values: the minimum value and the maximum value of the range. The maximum value of the range is also called an upper limit threshold value, and the minimum value of the range is also called a lower limit threshold value. For example, it is possible to adopt, as the upper limit threshold value and the lower limit threshold value of the accumulated amount in the low delay mode, values in which respective mean values of upper limit threshold values and lower limit threshold values are equal to the reference value of the accumulated amount in the low delay mode.

In a case where the accumulated amount in the buffer 44 is equal to or more than the lower limit threshold value of the accumulated amount in the low delay mode and equal to or less than the upper limit threshold value thereof, the data control section 45 reads the encoded data for the oldest one frame stored in the buffer 44 and supplies the encoded data to the data output section 46.

In a case where the accumulated amount in the buffer 44 is larger than the upper limit threshold value of the accumulated amount in the low delay mode, in order to reduce the accumulated amount in the buffer 44, the data control section 45 discards the encoded data stored in the buffer 44 on a frame-by-frame basis in accordance with the data control information of the encoded data.

In a case where the accumulated amount in the buffer 44 is smaller than the lower limit threshold value of the accumulated amount in the low delay mode, in order to increase the accumulated amount in the buffer 44, the data control section 45 copies (inserts) the encoded data stored in the buffer 44 on a frame-by-frame basis in accordance with the data control information of the encoded data.

On the other hand, in a case where the delay mode indicated by the delay control information from the delay control information analysis section 43 is changed from the low delay mode to the normal delay mode, in order to increase the delay time, the data control section 45 copies (inserts) the encoded data stored in the buffer 44 on a frame-by-frame basis in accordance with the data control information of the encoded data.

Specifically, in a case where the flag as the data control information of the oldest encoded data stored in the buffer 44 is set to 0 that indicates prohibition of both the insertion and the discarding of the encoded data, the data control section 45 reads the oldest encoded data stored in the buffer 44 without copying, and supplies the read data to the data output section 46.

On the other hand, in a case where the flag as the data control information of the oldest encoded data stored in the buffer 44 is set to 1 that indicates permission of both the insertion and the discarding of the encoded data, the data control section 45 copies and reads the oldest encoded data stored in the buffer 44, and supplies the read data to the data output section 46.

When reading the next encoded data, the data control section 45 reads a copy of the oldest encoded data, among the encoded data stored in the buffer 44, and thereafter repeats similar processing.

For example, in a case where encoded data corresponding to silence continues, the flag as the data control information of encoded data of a plurality of consecutive frames becomes 1, and respective pieces of the encoded data of the plurality of frames are copied consecutively.

When the accumulated amount in the buffer 44 is a value close to a reference value of the accumulated amount in the normal delay mode (the number of frames for predetermined time as appropriate time as the delay time in the normal delay mode) (e.g., 64 frames, etc.) due to copy of the encoded data stored in the buffer 44, the data control section 45 controls reading of the encoded data from the buffer 44 in accordance with the threshold value of the accumulated amount (in the buffer 44) in the normal delay mode and with the data control information.

Here, the delay time in the normal delay mode is larger than the delay time in the low delay mode, and therefore the reference value of the accumulated amount in the normal delay mode is larger than the reference value of the accumulated amount in the low delay mode.

In addition, the threshold value of the accumulated amount in the normal delay mode is a threshold value representing a range, similarly to the threshold value of the accumulated amount in the low delay mode, and has two values: a lower limit threshold value that is the minimum value and an upper limit threshold value that is the maximum value of the range. For example, it is possible to adopt, as the upper limit threshold value and the lower limit threshold value of the accumulated amount in the normal delay mode, values in which respective mean values of upper limit threshold values and lower limit threshold values are equal to the reference value of the accumulated amount in the normal delay mode.

In a case where the accumulated amount in the buffer 44 is equal to or more than the lower limit threshold value of the accumulated amount in the normal delay mode and equal to or less than the upper limit threshold value thereof, the data control section 45 reads the encoded data of the oldest one frame stored in the buffer 44 and supplies the encoded data to the data output section 46.

In a case where the accumulated amount in the buffer 44 is larger than the upper limit threshold value of the accumulated amount in the normal delay mode, in order to reduce the accumulated amount in the buffer 44, the data control section 45 discards the encoded data stored in the buffer 44 on a frame-by-frame basis in accordance with the data control information of the encoded data.

In a case where the accumulated amount in the buffer 44 is smaller than the lower limit threshold value of the accumulated amount in the normal delay mode, in order to increase the accumulated amount in the buffer 44, the data control section 45 copies the encoded data stored in the buffer 44 on a frame-by-frame basis in accordance with the data control information of the encoded data.

It is to be noted that the range defined by the upper limit threshold value and the lower limit threshold value of the accumulated amount in the normal delay mode and the range defined by the upper limit threshold value and the lower limit threshold value of the accumulated amount in the low delay mode may be a range having no overlapping or a range partially overlapping each other. It is possible to adopt, as the range defined by the upper limit threshold value and the lower limit threshold value of the accumulated amount in the low delay mode and the range defined by the upper limit threshold value and the lower limit threshold value of the accumulated amount in the normal delay mode, a range in which at least a portion of the range defined by the upper limit threshold value and the lower limit threshold value of the accumulated amount in the low delay mode is smaller than the range defined by the upper limit threshold value and the lower limit threshold value of the accumulated amount in the normal delay mode.

The data output section 46 is supplied with encoded data of which usage is controlled from the data control section 45.

The data output section 46 outputs the encoded data supplied from the data control section 45 to the output unit 22 via the LPCM buffer 47.

That is, the data output section 46 is, for example, an SBC decoder, and decodes the encoded data supplied from the data control section 45 into LPCM data as acoustic data and outputs the decoded LPCM data to the LPCM buffer 47.

The LPCM buffer 47 temporarily stores the LPCM data supplied from the data output section 46.

The LPCM data stored in the LPCM buffer 47 is read at a rate required for real-time reproduction, and is supplied to the output unit 22.

The output unit 22 outputs an acoustic corresponding to the LPCM data from the LPCM buffer 47.

The transmission and reception of data by wireless communication between the transmission unit 12 and the reception unit 21 as described above do not necessarily succeed, depending on the condition of a transmission path (radio wave status) between the transmission unit 12 and the reception unit 21, or the like.

In a case where the transmission and reception of data by wireless communication between the transmission unit 12 and the reception unit 21 fail, retransmission is performed, in which data is transmitted again from the transmission unit 12 to the reception unit 21.

For this retransmission, the transmission unit 12 on the transmission side includes the buffer 33, and the reception unit 21 on the reception side includes the buffer 44.

In addition, in a case where the transmission and reception of data fail, encoded data to be decoded by the data output section 46 no longer exists in the reception unit 21, and as a result, output of data (acoustic data) to the output unit 22 is interrupted, causing sound interruption. In order to suppress such sound interruption, the reception unit 21 temporarily stores the encoded data in the buffer 44, and starts reading the encoded data from the buffer 44 after the accumulated amount in the buffer 44 reaches a predetermined value sufficient to suppress the sound interruption. For example, the time from the start of storing the encoded data in the buffer 44 until the accumulated amount in the buffer 44 reaches the predetermined value constitutes delay time.

<Transmission Processing>

FIG. 3 is a flow chart describing an example of transmission processing performed by the transmission unit 12 in FIG. 2 for transmitting acoustic data.

In step S11, the data generation section 32 encodes the LPCM data as the acoustic data supplied from the supply unit 11 on a frame-by-frame basis, and the processing proceeds to step S12.

That is, the data generation section 32 divides the acoustic data supplied from the supply unit 11 into frames, and performs encoding for compressing the acoustic data of the oldest frame.

In step S12, the data generation section 32 determines the SF or tonality as the sensed feature amount representing a degree in which the insertion or discarding of the frame is sensed, from the frame of the acoustic data encoded immediately before, and the processing proceeds to step S13.

In step S13, the data generation section 32 compares the sensed feature amount of the frame of the acoustic data encoded immediately before and the threshold value with each other, and generates data control information for the encoded data of the frame of the acoustic data encoded immediately before, in accordance with a result of the comparison.

That is, in a case where the sensed feature amount of the frame (hereinafter, also referred to as a frame of interest) of the acoustic data encoded immediately before is less than the threshold value, e.g., in a case where the frame of interest is acoustic data of a noise property and where insertion (copy) or discarding of the frame of interest is less likely to be sensed, the data generation section 32 generates a flag as one piece of data control information indicating that insertion and discarding are permitted for the frame of interest, and the processing proceeds from step S13 to step S14.

In addition, in a case where the sensed feature amount of the frame of interest is not less than the threshold value, e.g., in a case where the frame of interest is tonal acoustic data and where insertion or discarding of the frame of interest is not less likely to be sensed, the data generation section 32 generates a flag as the data control information of 0 that indicates prohibition of the insertion or discarding for the frame of interest, and the processing proceeds from step S13 to step S14.

In step S14, the data generation section 32 generates transmission target data by integrating the encoded data resulting from encoding of the frame of interest, the data control information (flag) of the frame of interest, and the delay control information for the frame of interest supplied from the delay control information generation section 31 together, and the processing proceeds to step S15.

In step S15, the data generation section 32 supplies the transmission target data to the buffer 33 and stores the data therein.

The transmission target data stored in the buffer 33 is read as appropriate and supplied to the packetization section 34.

When the transmission target data is supplied from the buffer 44, the packetization section 34 packetizes the transmission target data into a packet and supplies the packet to the communication section 35 in step S16.

Further, in step S16, the communication section 35 modulates the packet from the packetization section 34 into an RF signal, transmits (transfers) the RF signal by wireless communication, and the transmission processing is finished.

It is to be noted that the pieces of processing of steps S11 to S16 are performed in a pipeline as necessary.

<Receiving Processing>

FIG. 4 is a flow chart describing an example of reception processing performed by the reception unit 21 in FIG. 2 for receiving acoustic data.

In step S21, the communication section 41 waits for the RF signal of the packet to be transmitted from the communication section 35, receives the RF signal, and demodulates the packet from the RF signal. Then, the communication section 41 supplies the packet to the packet division section 42. The packet division section 42 divides the packet from the communication section 41, and extracts transmission target data from the packet. Then, the packet division section 42 supplies the transmission target data to the delay control information analysis section 43, and the processing proceeds from step S21 to step S22.

In step S22, the delay control information analysis section 43 divides the transmission target data from the packet division section 42 into the delay control information, the data control information (flag), and the encoded data, and the processing proceeds to step S23.

In step S23, the delay control information analysis section 43 supplies the encoded data to the buffer 44 for storage, and supplies the delay control information and the data control information to the data control section 45, and the processing proceeds to step S24.

In step S24, the data control section 45 sets the upper limit threshold value and the lower limit threshold value of the accumulated amount in the buffer 44 in accordance with the delay control information of the latest encoded data stored in the buffer 44 (encoded data processed in step S23 performed immediately before) (hereinafter, also referred to as data of interest), and the processing proceeds to step S25.

As a result, in a case where the delay mode indicated by the delay control information of the data of interest is the normal delay mode, the upper limit threshold value and the lower limit threshold value of the accumulated amount in the buffer 44 are set, respectively, to the upper limit threshold value and the lower limit threshold value in the normal delay mode. In addition, in a case where the delay mode indicated by the delay control information of the data of interest is the low delay mode, the upper limit threshold value and the lower limit threshold value of the accumulated amount in the buffer 44 are set, respectively, to the upper limit threshold value and the lower limit threshold value in the low delay mode.

In step S25, the data control section 45 checks the accumulated amount in the buffer 44 (the number of frames as encoded data stored in the buffer 44) (the buffer amount), and the processing proceeds to step S26.

In step S26, the data control section 45 determines whether or not the accumulated amount in the buffer 44 is equal to or more than the lower limit threshold value and equal to or less than the upper limit threshold value.

In a case where it is determined in step S26 that the accumulated amount in the buffer 44 is equal to or more than the lower limit threshold value and equal to or less than the upper limit threshold value, the data control section 45 reads (frames as) the oldest encoded data from the buffer 44, supplies the read data to the data output section 46, and the processing proceeds to step S30.

Here, the reading of the oldest encoded data from the buffer 44, which is performed in a case where the accumulated amount in the buffer 44 is equal to or more than the lower limit threshold value and equal to or less than the upper limit threshold value, is also referred to as normal reading hereinafter. In the normal reading, the encoded data read from the buffer 44 is erased from the buffer 44 after reading.

In step S30, the data output section 46 decodes the encoded data supplied from the buffer 44, outputs the resulting LPCM data to the output unit 22 via the LPCM buffer 47, and the reception processing is finished.

On the other hand, in a case where it is determined in step S26 that the accumulated amount in the buffer 44 is not equal to or more than the lower limit threshold value, i.e., in a case where the accumulated amount in the buffer 44 is small (in a case where it is insufficient), the processing proceeds to step S27.

In step S27, the data control section 45 determines whether or not a flag, as the data control information of the oldest encoded data stored in the buffer 44 is set to 1 that indicates permission of the insertion and discarding.

In a case where it is determined in step S27 that the data control information of the oldest encoded data is not set to 1 that indicates permission of the insertion and discarding, i.e., in a case where the data control information of the oldest encoded data is set to 0 that indicates prohibition of the insertion or discarding, the data control section 45 performs normal reading of the oldest encoded data from the buffer 44. Then, the data control section 45 supplies the encoded data subjected to the normal reading to the data output section 46, and the processing proceeds to step S30; hereinafter, the above-described processing is performed.

In addition, in a case where it is determined in step S27 that the data control information of the oldest encoded data is set to 1 that indicates permission of the insertion and discarding, the processing proceeds to step S28.

In step S28, the data control section 45 determines whether or not a count value of a built-in counter (not illustrated) is equal to or more than a threshold value of the count value.

Here, the data control section 45 counts, as count values, the number of times of the normal reading consecutively performed in the built-in counters. The count value of the counter is incremented by 1 each time the normal reading is performed while the normal reading is consecutively performed; in a case where the normal reading is not performed, i.e., in a case where the copying (insertion) or discarding of the encoded data is performed, the count value of the counter is reset.

In a case where it is determined in step S28 that the count value is not equal to or more than the threshold value, i.e., in a case where the normal reading is not performed consecutively for the number of times equal to or more than the threshold value after the previous copying or discarding of the encoded data is performed and where there is no long time since the previous copying or discarding of the encoded data is performed, the data control section 45 performs normal reading of the oldest encoded data from the buffer 44. Then, the data control section 45 supplies the encoded data subjected to the normal reading to the data output section 46, and the processing proceeds to step S30; hereinafter, the above-described processing is performed.

In addition, in a case where it is determined in step S28 that the count value is equal to or more than the threshold value, i.e., in a case where the normal reading is consecutively performed for the number of times equal to or more than the threshold value after the previous copying or discarding of the encoded data is performed and where there is a certain amount of time since the previous copying or discarding of the encoded data is performed, the processing proceeds to step S29.

In step S29, the data control section 45 copies the oldest encoded data stored in the buffer 44.

That is, the data control section 45 reads the oldest encoded data from the buffer 44, supplies the oldest encoded data to the data output section 46, and inserts a copy of the oldest encoded data after the oldest encoded data by keeping the copy of the oldest encoded data as it is in the buffer 44.

Thereafter, the data control section 45 resets the count value to 0, and the processing proceeds to step S30; hereinafter, the above-described processing is performed.

On the other hand, in a case where it is determined in step S26 that the accumulated amount in the buffer 44 is not equal to or less than the upper limit threshold value, i.e., in a case where the accumulated amount in the buffer 44 is large (excessive), the processing proceeds to step S31.

In steps S31 and S32, processing similar to those in steps S27 and S28 is performed.

That is, in step S31, the data control section 45 determines whether or not the data control information of the oldest encoded data stored in the buffer 44 is set to 1 that indicates permission of the copying and discarding (of the encoded data).

In a case where it is determined in step S31 that the data control information of the oldest encoded data is not set to 1 that indicates permission of the copying and discarding, i.e., in a case where the data control information of the oldest encoded data is set to 0 that indicates prohibition of the insertion and discarding, the data control section 45 performs normal reading of the oldest encoded data from the buffer 44. Then, the data control section 45 supplies the encoded data subjected to the normal reading to the data output section 46, and the processing proceeds to step S30; hereinafter, the above-described processing is performed.

In addition, in a case where it is determined in step S31 that the data control information of the oldest encoded data is set to 1 that indicates permission of the copying and discarding, the processing proceeds to step S32.

In step S32, the data control section 45 determines whether or not the count value of the built-in counter is equal to or more than the threshold value of the count value.

In a case where it is determined in step S32 that the count value is not equal to or more than the threshold value, the data control section 45 performs normal reading of the oldest encoded data from the buffer 44. Then, the data control section 45 supplies the encoded data subjected to the normal reading to the data output section 46, and the processing proceeds to step S30; hereinafter, the above-described processing is performed.

In a case where it is determined in step S32 that the count value is equal to or more than the threshold value, the processing proceeds to step S33.

In step S33, the data control section 45 discards the oldest encoded data stored in the buffer 44.

That is, the data control section 45 discards the oldest encoded data by skipping the reading of the oldest encoded data stored in the buffer 44, and reads the second oldest encoded data from the buffer 44 to supply the second oldest encoded data to the data output section 46.

Thereafter, the data control section 45 resets the count value to 0, and the processing proceeds to step S30; hereinafter, the above-described processing is performed.

It is to be noted that the pieces of processing of steps S21 to S33 are performed in a pipeline as necessary.

In addition, the order of the reception processing illustrated in FIG. 4 is an example; for example, in a case where the reception unit 21 is not able to normally receive (an RF signal of) a packet from the transmission unit 12, etc., the processing from step S25 to step S30 is repeatedly performed to enable a variety of variations such as reproduction of acoustics to be carried out using the encoded data stored in the buffer 44.

As described above, the transmission unit 12 generates the data control information for controlling of the usage of (the encoded data of) the acoustic data in the reception unit 21, generates the delay control information indicating the delay mode regarding delay time when processing the acoustic data in the reception unit, and transmits the acoustic data, the data control information, and the delay control information by wireless communication.

Meanwhile, the reception unit 21 receives the acoustic data, the data control information, and the delay control information transmitted by wireless communication, controls the usage of the acoustic data in accordance with the data control information and the delay control information, and outputs data of which the usage is controlled. Specifically, for example, in the reception unit 21, the data control section 45 sets the upper limit threshold value and the lower limit threshold value to be compared with the accumulated amount in the buffer 44 in accordance with the delay control information, and controls the insertion and discarding of the encoded data of the acoustic data buffered (stored) in the buffer 44 in accordance with results of comparison between the accumulated amount in the buffer and the upper limit threshold value as well as the lower limit threshold value and with the data control information.

Accordingly, it is possible to easily perform switching of the delay time of the acoustic data in the reception unit 21 without disconnecting the wireless communication.

Further, upon the switching of the delay time, the insertion or discarding of the encoded data is controlled in accordance with the data control information obtained using the sensed feature amount, thus making it possible to perform the switching of the delay time without causing the user to feel a sense of discomfort.

<Second Configuration Example of Transmission Unit 12 and Reception Unit 21>

FIG. 5 is a block diagram illustrating a second configuration example of the transmission unit 12 and the reception unit 21 in FIG. 1.

It is to be noted that, in the drawing, parts corresponding to the case in FIG. 2 are denoted by the same reference numerals, and the description thereof is omitted as appropriate.

In FIG. 5, the transmission unit 12 has the delay control information generation section 31, the buffer 33, the packetization section 34, the communication section 35, a data generation section 51, a reception unit buffer monitoring section 52, and a compression rate control section 53.

Accordingly, the transmission unit 12 in FIG. 5 is common to the case of FIG. 2 in that the delay control information generation section 31, the buffer 33, the packetization section 34, and the communication section 35 are included. However, the transmission unit 12 in FIG. 5 differs from the case of FIG. 2 in that the data generation section 51 is provided in place of the data generation section 32 and that the reception unit buffer monitoring section 52 and the compression rate control section 53 are newly provided.

In addition, in FIG. 5, the reception unit 21 includes the communication section 41, the packet division section 42, the delay control information analysis section 43, the buffer 44, the data control section 45, the data output section 46, and the LPCM buffer 47.

Thus, the reception unit 21 in FIG. 5 is configured similarly to the case of FIG. 2.

In FIG. 5, in addition to the transmission unit 12 and the reception unit 21 controlling (switching) the delay time similarly to the case of FIG. 2, the transmission unit 12 adaptively controls (adjusts) a compression rate at the time of encoding the acoustic data in accordance with the condition of the transmission path (communication status).

It is possible to utilize, for example, a technique described in Japanese Unexamined Patent Application Publication No. 2016-208215 to control the compression rate.

That is, in the transmission unit 12, transmission target data stored in the buffer 33 is transmitted via the packetization section 34 and the communication section 35, and is deleted from the buffer 33 except in a case where retransmission is requested from the reception unit 21 (in a case where a message indicating normal reception is not able be received from the reception unit 21).

On the other hand, in a case where retransmission is requested from the reception unit 21, the transmission target data stored in the buffer 33 is maintained as it is in the buffer 33, and is retransmitted.

Accordingly, when the condition of the transmission path is poor and the frequency at which the retransmission is requested from the reception unit 21 is high, the accumulated amount in the buffer 33 becomes large.

In addition, also in a case where processing performed by the transmission unit 12 is heavily loaded, the accumulated amount in the buffer 33 becomes large.

On the other hand, in a case where the condition of the transmission path is favorable and no retransmission is requested from the reception unit 21, the accumulated amount in the buffer 33 becomes small.

Thus, in accordance with the accumulated amount in the buffer 33, it is possible to estimate the condition of the transmission path.

In FIG. 5, the transmission unit 12 regards the accumulated amount in the buffer 33 as the condition of the transmission path, and adaptively controls the compression rate in accordance with the accumulated amount in the buffer 33 as the condition of the transmission path.

That is, in a case where the condition of the transmission path is poor and the frequency of retransmission is high, the accumulated amount in the buffer 33 of the transmission unit 12 tends to increase and becomes equal to or more than the threshold value. Further, the accumulated amount in the buffer 44 of the reception unit 21 is reduced, and the possibility of causing sound interruption becomes high.

Therefore, in a case where the accumulated amount in the buffer 33 of the transmission unit 12 tends to increase or is equal to or more than the threshold value, the transmission unit 12 increases the compression rate and encodes the acoustic data at a high compression rate to thereby allocate a small number of bits corresponding to, for example, a rate, etc. of 229 kbps (Kilo Bit Per Second) per frame, and transmits (encoded data of) the acoustic data.

In this case, it is possible to transmit a large number of frames per unit time, making it easier to increase the accumulated amount in the buffer 44 of the reception unit 21 and thus to secure retransmission time.

That is, in a case where the compression rate is high, it is possible to transmit the encoded data of the acoustic data of a larger number of frames in one packet, thus allowing the reception unit 21 to receive the one packet, thereby causing the accumulated amount in the buffer 44 to be larger.

Further, reproduction time required for reproducing the frame of the acoustic data of which the encoded data is included in the packet is longer than transmission time required for transmitting the packet, thus making it easier to secure the retransmission time as the reproduction time becomes longer.

Here, a value obtained by subtracting the transmission time of the packet from the reproduction time of the frame of the acoustic data of which the encoded data is included in the packet is a retransmission possible time available for retransmission, and a value obtained by dividing the retransmission possible time by the reproduction time is referred to as retransmission possible time or success probability of communication (transfer).

In a case where the condition of the transmission path is favorable and the retransmission is hardly performed, the accumulated amount in the buffer 33 of the transmission unit 12 tends to fall and becomes almost zero. Further, the accumulated amount in the buffer 44 of the reception unit 21 is maintained at a certain degree of value, allowing the possibility of causing sound interruption to be lower.

Therefore, in a case where the accumulated amount in the buffer 33 of the transmission unit 12 tends to decrease or is almost zero, in order to improve the sound quality of the acoustic outputted from the output unit 22, the transmission unit 12 lowers the compression rate and encodes the acoustic data at a low compression rate, thereby allocating a large number of bits corresponding to a rate, etc. of 384 kbps per frame, for example, to transmit the acoustic data.

In a case where the compression rate is low, the number of frames of acoustic data that is able to be transmitted in one packet becomes less, and the amount of increase in the accumulated amount in the buffer 44 becomes smaller due to the reception unit 21 receiving one packet. However, retransmission is hardly performed in a case where the condition of the transmission path is favorable, and thus the accumulated amount in the buffer 44 of the reception unit 21 is maintained at a certain degree of value, allowing the possibility of causing sound interruption to be lower.

Further, when the encoding method allows for encoding of the acoustic data at a lower compression rate, it is possible to further improve the sound quality of the acoustic outputted from the output unit 22 without coupling again.

It is to be noted that a value of the compression rate is represented by a percentage D2/D1 of data amount D2 of data after encoding (encoded data) to data amount D1 of data before encoding. Thus, the higher the compression rate is, the smaller the value D2/D1 representing the compression rate becomes; the lower the compression rate is, the larger the value D2/D1 representing the compression rate becomes.

For example, as for a compression rate of 1/5, a value 1/5 representing the compression rate of 1/5 is larger than a value 1/6 representing a compression rate of 1/6, but the compression rate of 1/5 is less compressed than the compression rate of 1/6.

Thus, for example, the compression rate of 1/5 is the lowest compression rate, and a compression rate equal to or more than the compression rate of 1/5 is compression rates of 1/5, 1/6, 1/7, etc. with a value of 1/5 or less.

Incidentally, in a case where the delay mode is the low delay mode, the accumulated amount in the buffer 44 of the reception unit 21 is small. In a case where the accumulated amount in the buffer 44 is small, the buffer 44 is more likely to become empty, and therefore the sound interruption is more likely to occur, thus causing low resistance to a transfer error of (an RF signal of) a packet from the transmission unit 12 to the reception unit 21.

Accordingly, in the low delay mode, in order not to cause the buffer 44 of the reception unit 21 to be empty, it is desirable to increase the compression rate in transmission unit 12 to transmit encoded data of acoustic data of a larger number of frames in one packet, and to cause the reception unit 21 to receive the one packet to thereby increase the accumulated amount in the buffer 44.

On the other hand, in the normal delay mode, the accumulated amount in the buffer 44 of the reception unit 21 becomes a certain level of value, and thus the possibility of causing sound interruption is low. Accordingly, in the normal delay mode, it is desirable to lower the compression rate to improve the sound quality of the acoustic outputted from the output unit 22.

Therefore, in the transmission unit 12 in FIG. 5, control is performed to allow the compression rate to be high in the low delay mode, and control is performed to allow the compression rate to be low in the normal delay mode.

However, in the low delay mode, the accumulated amount in the buffer 44 of the reception unit 21 is small; therefore, in a case where the delay mode is switched from the low delay mode to the normal delay mode, when the compression rate is immediately changed to the low compression rate, the number of frames of acoustic data transmittable in one packet becomes small, and thus the possibility of causing the buffer 44 to be empty, i.e., the possibility of causing sound interruption becomes high.

Therefore, the transmission unit 12 in FIG. 5 monitors a reception buffer status, which is the status of the buffer 44 of the reception unit 21; in a case where the delay mode is switched from the low delay mode to the normal delay mode, confirmation is made that the reception buffer status is a status where the possibility of causing sound interruption is low, and thereafter the compression rate is changed from a high compression rate to a low compression rate.

That is, in the transmission unit 12, the data generation section 51 is supplied with the delay control information from the delay control information generation section 31 and with the LPCM data, which is acoustic data, from the supply unit 11.

Similarly to the data generation section 32 in FIG. 2, the data generation section 51 serves as an encoding section that encodes the acoustic data from the supply unit 11 on a frame-by-frame basis. However, the data generation section 51 encodes a frame of acoustic data at a compression rate (compression rate supplied from the compression rate control section 53) under the control of the compression rate control section 53.

In addition, similarly to the data generation section 32 in FIG. 2, the data generation section 51 serves as a data control information generation section that generates data control information for a frame of acoustic data corresponding to encoded data.

That is, the data generation section 51 determines a sensed feature amount for the frame of acoustic data, and generates data control information on the basis of the sensed feature amount.

Similarly to the data generation section 32 in FIG. 2, the data generation section 51 generates transmission target data in which the encoded data obtained by encoding the frame of the acoustic data from the supply unit 11, data control information of the frame, and delay control information from the delay control information generation section 31 for the frame are combined as a set, and supplies the transmission target data to the buffer 33.

Further, the data generation section 51 supplies the data control information and the delay control information of each frame of the acoustic data to the reception unit buffer monitoring section 52.

The reception unit buffer monitoring section 52 estimates the reception buffer status of the buffer 44 of the reception unit 21 from the data control information from the data generation section 51, and monitors the reception buffer status.

That is, the reception unit buffer monitoring section 52 sequentially stores the data control information from the data generation section 51, thereby storing a certain number of the latest data control information.

The reception unit buffer monitoring section 52 compares the delay mode indicated by the latest delay control information from the data generation section 51 with the delay mode indicated by the previous delay control information, and supplies the delay control information indicating the normal delay mode or the low delay mode to the compression rate control section 53 in accordance with a result of the comparison and the reception buffer status.

Here, the operation state of the reception unit buffer monitoring section 52 includes a monitoring state in which the reception buffer status of the buffer 44 of the reception unit 21 is monitored, and a normal state which is not a monitoring state.

In a case where the delay mode indicated by the latest delay control information is not changed from the delay mode indicated by the previous delay control information and where the operation state of the reception unit buffer monitoring section 52 is the normal state, the reception unit buffer monitoring section 52 supplies the latest delay control information to the compression rate control section 53.

In a case where the delay mode indicated by the latest delay control information is the low delay mode and where the delay mode indicated by the previous delay control information is the normal delay mode, i.e., in a case where the delay mode is changed (altered) from the normal delay mode to the low delay mode, the reception unit buffer monitoring section 52 supplies the latest delay control information, i.e., delay control information indicating the low delay mode, to the compression rate control section 53.

In a case where the delay mode indicated by the latest delay control information is the normal delay mode and where the delay mode indicated by the previous delay control information is the low delay mode, i.e., in a case where the delay mode is changed from the low delay mode to the normal delay mode, the reception unit buffer monitoring section 52 shifts the operation state to the monitoring state.

In the monitoring state, the reception unit buffer monitoring section 52 estimates the reception buffer status of the buffer 44 of the reception unit 21 from stored data-control-information sequence (history), and monitors the reception buffer status. Further, in a case where copying (insertion) based on the data control information is performed for the encoded data stored in the buffer 44 of the reception unit 21, the reception unit buffer monitoring section 52 calculates (estimates) the number of reproducible frames (hereinafter, also referred to as reproducible frame number) from the reception buffer status.

Further, the reception unit buffer monitoring section 52 compares the reproducible frame number with a threshold value (e.g., a reference value of the accumulated amount in the normal delay mode, etc.) predetermined as a value at which sound interruption is less likely to occur.

Then, in a case where the reproducible frame number exceeds the threshold value, i.e., in a case where the reception buffer status is a status where sound interruption is less likely to occur even when the reception buffer status shifts to the normal delay mode, the reception unit buffer monitoring section 52 cancels the monitoring state, and shifts the operation state to the normal state to supply the delay control information indicating the normal delay mode to the compression rate control section 53.

On the other hand, in a case where the reproducible frame number does not exceed the threshold value, i.e., in a case where the reception buffer status is not a status where sound interruption is less likely to occur even when the reception buffer status shifts to the normal delay mode, the reception unit buffer monitoring section 52 keeps the operation state monitored, and supplies the compression rate control section 53 with the delay control information indicating the low delay mode, instead of the latest delay control information.

It is to be noted that, in a case where the operation state is the monitoring state, when the delay mode indicated by the latest delay control information is the low delay mode and when the delay mode indicated by the previous delay control information is the normal delay mode, i.e., when the delay mode is changed from the normal delay mode to the low delay mode, the reception unit buffer monitoring section 52 cancels the monitoring state, and shifts the operation state to the normal state to supply the latest delay control information, i.e., the delay control information indicating the low delay mode, to the compression rate control section 53.

As described above, in a case where the delay mode indicated by the delay control information supplied from the data generation section 51 is changed from the low delay mode to the normal delay mode, the reception unit buffer monitoring section 52 monitors the reception buffer status, and checks whether or not the reception buffer status is a status where sound interruption is less likely to occur. Then, in a case where the reception buffer status is not the status where sound interruption is less likely to occur, the reception unit buffer monitoring section 52 supplies delay control information indicating the delay mode before the change, i.e., the low delay mode, to the compression rate control section 53. Further, the reception unit buffer monitoring section 52 waits for the reception buffer status to be a status where sound interruption is less likely to occur even when the reception buffer status shifts to the normal delay mode, and supplies the delay control information indicating the delay mode after the change i.e., the normal delay mode, to the compression rate control section 53.

As described above, immediately after the delay mode is changed from the low delay mode to the normal delay mode, the accumulated amount in the buffer 44 of the reception unit 21 is small (the delay time is small), as a result of which, it is possible to suppress occurrence of the sound interruption.

Here, in the above-described instances, in a case where the delay mode is changed from the low delay mode to the normal delay mode, the operation state of the reception unit buffer monitoring section 52 becomes the monitoring state to monitor the reception buffer status of the buffer 44 of the reception unit 21; however, in addition, for example, even in a case where the delay mode is changed from the normal delay mode to the low delay mode, it is possible to set the operation state of the reception unit buffer monitoring section 52 to the monitoring state.

In the monitoring state in a case where the delay mode is changed from the normal delay mode to the low delay mode, the reception unit buffer monitoring section 52 supplies the delay control information indicating the normal delay mode, which is the delay mode before the change, to the compression rate control unit 53; monitors the reception buffer status of the buffer 44 of the reception unit 21; and calculates, from the reception buffer status, the minimum number of frames (hereinafter, also referred to as minimum reproduction frame number) required to be reproduced in a case where the frame of the acoustic data is reproduced while reducing the encoded data stored in the buffer 44 of the reception unit 21 on the basis of the data control information.

Further, for example, in a case where the delay mode is changed from the normal delay mode to the low delay mode, when a minimum reproduction frame number is calculated so as not to have a value that causes overflow of the buffer 44 of the reception unit 21, the reception unit buffer monitoring section 52 cancels the monitoring state, and supplies the compression rate control section 53 with the delay control information indicating the low delay mode which is the delay mode after the change.

Similarly to the technique described in Japanese Unexamined Patent Application Publication No. 2016-208215, for example, the compression rate control section 53 intermittently acquires the accumulated amount (status) in the buffer 33, and determines the compression rate when the data generation section 51 performs encoding in accordance with (a sequence of) the accumulated amount in the buffer 33.

However, the maximum value of the compression rate (maximum compression rate), the minimum value of the compression rate (minimum compression rate), and a possible value of the compression rate determined by the compression rate control section 53 are switched in accordance with the delay mode indicated by the delay control information supplied from the reception unit buffer monitoring section 52 to the compression rate control section 53.

Accordingly, the compression rate control section 53 may be said to control the compression rate in accordance with the accumulated amount in the buffer 33, or may be said to control the compression rate in accordance with the delay control information. Further, the compression rate control section 53 may be said to control the compression rate in accordance with the delay control information and the accumulated amount in the buffer.

Here, in the present embodiment, a plurality of candidates of the compression rate (hereinafter, also referred to as compression rate candidate) determined as the compression rate, for example, is prepared in advance. In addition, the compression rate candidate is prepared for each delay mode, i.e., here, for each of the normal delay mode and the low delay mode.

For example, {1/2, 1/3, 1/6}, etc. are prepared as a plurality of compression rate candidates in the normal delay mode, and {1/4, 1/5, 1/10}, etc. are prepared as a plurality of compression rate candidates in the low delay mode. It is to be noted that, in the compression rate candidates {1/2, 1/3, 1/6} in the normal delay mode, the maximum value of 1/2 is the "lowest" compression rate, and the minimum value of 1/6 is the "highest" compression rate. Similarly, in the compression rate candidates {1/4, 1/5, 1/10} in the low delay mode, the maximum value of 1/4 is the "lowest" compression rate, and the minimum value of 1/10 is the "highest" compression rate.

It is possible to set the compression rate candidate in the normal delay mode and the compression rate candidates in the low delay mode, for example, to allow the range from the minimum compression rate to the maximum compression rate of the compression rate candidates in the low delay mode to be a range of a high compression rate, as compared with the range from the minimum compression rate to the maximum compression rate of the compression rate candidates in the normal delay mode.

The compression rate control section 53 selects and determines a compression rate from among the compression rate candidates in the delay mode indicated by the delay control information supplied from the reception unit buffer monitoring section 52, in accordance with (a sequence of) the accumulated amount in the buffer 33.

That is, for example, in a case where the delay mode indicated by the delay control information supplied from the reception unit buffer monitoring section 52 is the normal delay mode, the compression rate control section 53 selects a compression rate from among the compression rate candidates {1/2, 1/3, 1/6} in the normal delay mode in accordance with the accumulated amount in the buffer 33, and supplies the compression rate to the data generation section 51.

It is possible to perform the selection of the compression rate in accordance with the accumulated amount in the buffer 33 similarly to the technique described in, for example, Japanese Unexamined Patent Application Publication No. 2016-208215. That is, in a case where the accumulated amount in the buffer 33 is larger than the threshold value or tends to increase, a compression rate higher than the current compression rate is selected. In addition, for example, in a case where the accumulated amount in the buffer 33 tends to decrease and the values equal to or smaller than the threshold value continue, a compression rate lower than the current compression rate is selected.

Thereafter, when the delay mode indicated by the delay control information supplied from the reception unit buffer monitoring section 52 to the compression rate control section 53 is changed from the normal delay mode to the low delay mode, the compression rate control section 53 switches the compression rate candidate used for selecting the compression rate from the compression rate candidates {1/2, 1/3, 1/6} in the normal delay mode to the compression rate candidates {1/4, 1/5, 1/10} in the low delay mode.

Then, the compression rate control section 53 selects a compression rate from among the compression rate candidates {1/4, 1/5, 1/10} in the low delay mode in accordance with the accumulated amount in the buffer 33, and supplies the compression rate to the data generation section 51.

It is to be noted that, immediately after the delay mode indicated by the delay control information supplied from the reception unit buffer monitoring section 52 to the compression rate control section 53 is changed, the compression rate control section 53 is able to select a compression rate candidate close to the compression rate immediately before the change in the delay mode, from among the compression rate candidates in the delay mode after the change, for example. In addition, the compression rate control section 53 is able to select, as a compression rate, a compression rate candidate of which the above-described success probability is close to the case of the compression rate immediately before the change in the delay mode, from among the compression rate candidates in the delay mode after the change, for example.

Here, as described above, in a case where the delay mode indicated by the delay control information is changed from the low delay mode to the normal delay mode, the reception unit buffer monitoring section 52 shifts the operation state to the monitoring state, monitors the reception buffer status, and checks whether or not the reception buffer status is a status where sound interruption is less likely to occur. Then, in a case where the reception buffer status is not the status where sound interruption is less likely to occur, the reception unit buffer monitoring section 52 supplies the delay control information indicating the delay mode before the change, i.e., the low delay mode, to the compression rate control section 53. Further, the reception unit buffer monitoring section 52 waits for the reception buffer status to be a status where sound interruption is less likely to occur, and supplies the delay control information indicating the normal delay mode which is the delay mode after the change, to the compression rate control section 53.

Accordingly, even when the delay mode indicated by the delay control information is changed from the low delay mode to the normal delay mode, the reception unit buffer monitoring section 52 does not necessarily immediately supply the delay control information indicating the normal delay mode after the change, to the compression rate control section 53. That is, in a case where the delay mode indicated by the delay control information is changed from the low delay mode to the normal delay mode, the reception unit buffer monitoring section 52 waits the reception buffer status to be a status where sound interruption is less likely to occur, and supplies the delay control information indicating the normal delay mode which is the delay mode after the change, to the compression rate control section 53.

Then, as described above, immediately after the timing when the delay control information indicating the normal delay mode which is the delay mode after the change, is supplied from the reception unit buffer monitoring section 52, the compression rate control section 53 selects a compression rate from among the compression rate candidates in the normal delay mode to thereby control the compression rate in the encoding in the data generation section 51.

Accordingly, in a case where the delay mode indicated by the delay control information is changed from the low delay mode to the normal delay mode, the reception unit buffer monitoring section 52 serves as a timing control section that controls a timing of the compression rate control by the compression rate control section 53 in accordance with the reception buffer status.

It is to be noted that, in the above-mentioned cases, different compression rate candidates are adopted as the compression rate candidate in the normal delay mode and as the compression rate candidate in the low delay mode; however, the same compression rate candidate may be adopted as the compression rate candidate in the normal delay mode and as the compression rate candidate in the low delay mode.

<Transmission Processing>

FIG. 6 is a flow chart describing an example of transmission processing performed by the transmission unit 12 in FIG. 5 for transmitting acoustic data.

In step S51, the reception unit buffer monitoring section 52 acquires the latest delay control information supplied from the data generation section 51, checks whether or not the delay mode indicated by the latest delay control information has been changed from the delay mode indicated by the previous delay control information, i.e., whether or not the delay mode has been changed, and the processing proceeds to step S52.

In step S52, the reception unit buffer monitoring section 52 determines whether or not the change in the delay mode satisfies a monitoring state shifting condition for shifting the operation state to the monitoring state. Here, it is possible to adopt, as the monitoring state shifting condition, the delay mode indicated by the delay control information having been changed from the low delay mode to the normal delay mode.

In a case where it is determined in step S52 that the monitoring state shifting condition is satisfied, i.e., in a case where the delay mode indicated by the delay control information is changed from the low delay mode to the normal delay mode, the processing proceeds to step S53.

In step S53, in a case where the operation state is the normal state, the reception unit buffer monitoring section 52 shifts the operation state from the normal state to the monitoring state, starts monitoring the reception buffer status, and the processing proceeds to step S54.

In step S54, the reception unit buffer monitoring section 52 calculates the reproducible frame number from the reception buffer status, and the processing proceeds to step S55.

In step S55, the reception unit buffer monitoring section 52 determines whether or not the reproducible frame number is less than a threshold value (e.g., a reference value of the accumulated amounts of the normal delay mode, etc.) predetermined as a value at which sound interruption is less likely to occur.

In a case where it is determined in step S55 that the reproducible frame number is not less than the threshold value, i.e., in a case where the reception buffer status is a status where sound interruption is less likely to occur, the processing proceeds to step S59.

In addition, in a case where it is determined in step S55 that the reproducible frame number is less than the threshold value, i.e., in a case where the reception buffer status is not the status where sound interruption is less likely to occur, the processing proceeds to step S56.

In step S56, the reception unit buffer monitoring section 52 sets (changes) the latest delay control information from the data generation section 51 to the delay control information indicating the low delay mode and supplies the set delay control information to the compression rate control section 53, and the processing proceeds to step S60.

On the other hand, in a case where it is determined in step S52 that the monitoring state shifting condition is not satisfied, i.e., in a case where the delay mode indicated by the delay control information supplied from the data generation section 51 to the reception unit buffer monitoring section 52 has not been changed from the low delay mode to the normal delay mode, the processing proceeds to step S57.

In step S57, the reception unit buffer monitoring section 52 determines whether or not the operation state is the monitoring state.

In a case where it is determined in step S57 that the operation state is not the monitoring state, i.e., in a case where the operation state is the normal state, the reception unit buffer monitoring section 52 supplies the delay control information from the data generation section 51 to the compression rate control section 53, and the processing skips steps S58 and S59 and proceeds to step S60.

In addition, in a case where it is determined in step S57 that the operation state is the monitoring state, the processing proceeds to step S58.

In step S58, the reception unit buffer monitoring section 52 cancels the monitoring state, and determines whether or not a monitoring state cancellation condition for shifting the operation state to the normal state is satisfied. Here, it is possible to adopt, as the monitoring state cancellation condition, for example, the delay mode indicated by the delay control information having been changed from the normal delay mode to the low delay mode.

In a case where it is determined in step S58 that the monitoring state cancellation condition is not satisfied, i.e., in a case where the delay mode indicated by the delay control information is not changed from the normal delay mode to the low delay mode, the processing proceeds to step S54; hereinafter, the above-described processing is performed.

In addition, in a case where it is determined in step S58 that the monitoring state cancellation condition is satisfied, the processing proceeds to step S59, where the reception unit buffer monitoring section 52 cancels the monitoring state, and shifts the operation state to the normal state. Further, the reception unit buffer monitoring section 52 supplies the delay control information from the data generation section 51 to the compression rate control section 53, and the processing proceeds from step S59 to step S60.

In step S60, in accordance with the delay control information supplied from the reception unit buffer monitoring section 52 to the compression rate control section 53, the compression rate control section 53 sets the compression rate candidate in the delay mode indicated by the delay control information to a compression rate candidate of interest, which is a compression rate candidate used for control of the compression rate, and the processing proceeds to step S61.

In step S61, the compression rate control section 53 selects a compression rate from among the compression rate candidates of interest in accordance with the accumulated amount in the buffer 33 and supplies the compression rate to the data generation section 51 to thereby control the compression rate of the data generation section 51, and the processing proceeds to step S62.

In step S62, similarly to step S11 in FIG. 2, the data generation section 51 encodes LPCM data as the acoustic data supplied from the supply unit 11 on a frame-by-frame basis, and the processing proceeds to step S63. However, in step S62, the data generation section 51 performs encoding at the compression rate supplied from the compression rate control section 53 in step S61 immediately before.

In step S63, similarly to step S12 in FIG. 2, the data generation section 51 determines the SF or the tonality as the sensed feature amount of the frame of interest, which is the frame of the acoustic data encoded immediately before, and the processing proceeds to step S64.

In step S64, similarly to step S13 in FIG. 2, the data generation section 51 compares the sensed feature amount of the frame of interest with the threshold value, and generates data control information for the encoded data of the frame of interest in accordance with a result of the comparison. Then, the data generation section 51 supplies the data control information to the reception unit buffer monitoring section 52, and the processing proceeds from step S64 to step S65.

In step S65, the reception unit buffer monitoring section 52 updates history (flag information) of the data control information by causing an unillustrated FIFO to store the data control information (flag) supplied from the data generation section 51 in step S64 that was performed immediately before, and the processing proceeds to step S66.

It is to be noted that, in a case where the FIFO stores the data control information for a volume of the FIFO, the reception unit buffer monitoring section 52 deletes the oldest data control information from the FIFO, and causes the FIFO to store the latest data control information. In a case where the operation state is the monitoring state, the reception unit buffer monitoring section 52 recognizes the reception buffer status from (the history of) the data control information stored in the FIFO.

In steps S66 to S68, processing similar to those in steps S14 to S16 in FIG. 2 is performed.

It is to be noted that the pieces of processing of steps S51 to S68 are performed in a pipeline as necessary.

As described above, in the transmission unit 12 in FIG. 5, in addition to performing of processing similar to the case in FIG. 2, a compression rate candidate of interest is set in accordance with (a delay mode indicated by) the delay control information, and the compression rate is controlled in accordance with the accumulated amount in the buffer 33 by using the compression rate candidate of interest. This makes it possible to easily perform switching of the delay time of the acoustic data in the reception unit 21 without disconnecting the wireless communication as well as to appropriately control the compression rate in accordance with the delay mode and the condition of the transmission path to suppress the occurrence of sound interruption. In addition, it is possible to enhance the sound quality of an acoustic outputted from the output unit 22 in a case where the condition of the transmission path is favorable.

It is to be noted that, in the transmission unit 12 in FIG. 5, the accumulated amount in the buffer 33 is regarded as the condition of the transmission path, and the compression rate is adaptively controlled in accordance with the accumulated amount in the buffer 33 as the condition of the transmission path; however, the compression rate may have a variety of variations such as control in accordance with an operation, etc. of a user.

In addition, in the above case, the reception buffer status of the buffer 44 of the reception unit 21 is estimated from the history (sequence) of the data control information in the reception unit buffer monitoring section 52. In addition, however, in a case where the reception unit 21 returns a message indicating whether or not the packet has been able to be normally received, to the transmission unit 12 by wireless communication, for example, it is possible to take a variety of variations such as causing the reception unit 21 to transmit (reproducible frame number obtained from) the reception buffer status, together with the message, and causing the transmission unit 12 to perform processing similar to the above-described case using the reception buffer status transmitted from the reception unit 21.

<Third Configuration Example of Transmission Unit 12 and Reception Unit 21>

FIG. 7 is a block diagram illustrating a third configuration example of the transmission unit 12 and the reception unit 21 in FIG. 1.

It is to be noted that, in the drawing, parts corresponding to those in the cases in FIG. 2 or FIG. 5 are denoted by the same reference numerals, and description thereof is omitted below as appropriate.

In FIG. 7, the transmission unit 12 includes the buffer 33, the packetization section 34, the communication section 35, an adaptation delay control section 61, a delay control information generation section 62, a data generation section 63, a reception unit buffer monitoring section 64, and a compression rate control section 65.

Accordingly, the transmission unit 12 in FIG. 7 is common to the case of FIG. 5 in that the buffer 33, the packetization section 34, and the communication section 35 are included. However, the transmission unit 12 in FIG. 7 differs from the case of FIG. 5 in that the adaptation delay control section 61 is newly provided, and that the delay control information generation section 62, the data generation section 63, the reception unit buffer monitoring section 64, and the compression rate control section 65 are provided, respectively, in place of the delay control information generation section 31, the data generation section 51, the reception unit buffer monitoring section 52, and the compression rate control section 53.

In addition, in FIG. 7, the reception unit 21 includes the communication section 41, the packet division section 42, the delay control information analysis section 43, the buffer 44, the data output section 46, the LPCM buffer 47, and a data control section 71.

Accordingly, the reception unit 21 in FIG. 7 is common to the cases of FIGS. 2 and 5 in that the communication section 41, the packet division section 42, the delay control information analysis section 43, the buffer 44, the data output section 46, and the LPCM buffer 47 are included. However, the reception unit 21 in FIG. 7 differs from the cases of FIGS. 2 and 5 in that the data control section 71 is provided in place of the data control section 45.

In FIG. 7, similarly to the case of FIG. 5, the transmission unit 12 and the reception unit 21 control (switch) the delay time, and the transmission unit 12 adaptively controls the compression rate at the time of encoding the acoustic data in accordance with the condition of the transmission path (communication status); however, a plurality of pieces of time is prepared as the delay time in the low delay mode.

That is, in FIGS. 2 and 5, it is assumed that the delay time in the low delay mode is one predetermined delay time; however, in FIG. 7, a plurality of pieces of time, e.g., three pieces of time are prepared as the delay time in the low delay mode. In the following, low delay modes in which each of these three pieces of time is defined as the delay time are described, respectively, as low delay modes 1, 2, and 3. It is assumed that the delay time becomes shorter in the order of the low delay modes 1, 2, and 3.

In the transmission unit 12 in FIG. 7, the delay mode and thus the delay time adaptively change in accordance with the accumulated amount in the buffer 33 that represents the condition of the transmission path (communication status).

The adaptation delay control section 61 intermittently acquires the accumulated amount in the buffer 33, selects one low delay mode from among the low delay modes 1 to 3 in accordance with (a sequence of) the accumulated amount in the buffer 33, and supplies the one low delay mode to the delay control information generation section 62. Here, the low delay mode that the adaptation delay control section 61 selects from among the low delay modes 1 to 3 is also referred to as an accumulated-amount-based low delay mode.

Similarly to the delay control information generation section 62 in FIG. 2, the delay control information generation section 62 generates delay control information indicating the low delay mode or the normal delay mode in response to a request for switching the delay mode supplied thereto.

Further, the delay control information generation section 62 changes the delay mode indicated by the delay control information and thus the delay time, in accordance with the accumulated-amount-based low delay mode supplied from the adaptation delay control section 61.

That is, for example, in a case where the delay mode indicated by the delay control information is the normal delay mode, the delay control information generation section 62 supplies the delay control information indicating the normal delay mode as it is to the data generation section 63.

Further, for example, in a case where the delay mode indicated by the delay control information is the low delay mode, the delay control information generation section 62 changes (alters) the low delay mode indicated by the delay control information to the accumulated-amount-based low delay mode (low delay mode 1, 2, or 3) supplied from the adaptation delay control section 61, and supplies the delay control information after the change to the data generation section 63.

Accordingly, in FIG. 7, the delay mode indicated by the delay control information supplied from the delay control information generation section 62 to the data generation section 63 includes four types of delay modes: the normal delay mode and the low delay modes 1 to 3. For example, the normal delay mode and the low delay modes 1 to 3 are represented by values 0, 1, 2, and 3, respectively.

Similarly to the data generation section 51 in FIG. 5, the data generation section 63 encodes the acoustic data from the supply unit 11 on a frame-by-frame basis at a compression rate (compression rate supplied from the compression rate control section 65) according to the control of the compression rate control section 65.

In addition, similarly to the data generation section 51 in FIG. 5, the data generation section 63 generates data control information for a frame of acoustic data corresponding to the encoded data on the basis of a sensed feature amount.

Further, similarly to the data generation section 51 in FIG. 5, the data generation section 63 generates transmission target data in which encoded data obtained by encoding a frame of acoustic data, data control information of the frame, and delay control information from the delay control information generation section 62 for the frame are combined as a set, and supplies the transmission target data to the buffer 33.

Further, similarly to the data generation section 51 in FIG. 5, the data generation section 63 supplies the data control information and the delay control information of the respective frames of the acoustic data to the reception unit buffer monitoring section 64.

It is to be noted that the data generation section 63 differs from the data generation section 51 in FIG. 5 in that the delay control information handled by the data generation section 63 is not the delay control information indicating the two types of delay modes of the normal delay mode and the low delay mode, but the delay control information indicating the normal delay mode and the three types of the low delay modes 1 to 3.

Similarly to the reception unit buffer monitoring section 52 in FIG. 5, the reception unit buffer monitoring section 64 estimates the reception buffer status of the buffer 44 of the reception unit 21 from the data control information supplied from the data generation section 63, and monitors the reception buffer status.

That is, the reception unit buffer monitoring section 64 sequentially stores the data control information from the data generation section 63 to thereby store a certain number of the latest data control information.

The reception unit buffer monitoring section 64 compares the delay mode indicated by the latest delay control information from the data generation section 63 and the delay mode indicated by the previous delay control information with each other, and supplies the delay control information indicating the normal delay mode and the low delay mode 1, 2, or 3 to the compression rate control section 65 in accordance with a result of the comparison and the reception buffer status.

Specifically, in a case where the delay mode indicated by the latest delay control information is not changed from the delay mode indicated by the previous delay control information and where the operation state of the reception unit buffer monitoring section 64 is the normal state, the reception unit buffer monitoring section 64 supplies the latest delay control information to the compression rate control section 65.

In a case where the delay mode indicated by the latest delay control information is the low delay mode (one of the low delay modes 1 to 3) and where the delay mode indicated by the previous delay control information is the normal delay mode, i.e., in a case where the delay mode is changed (altered) from the normal delay mode to the low delay mode, the reception unit buffer monitoring section 64 supplies the latest delay control information to the compression rate control section 65.

In a case where the delay mode indicated by the latest delay control information is the normal delay mode and where the delay mode indicated by the previous delay control information is the low delay mode, i.e., in a case where the delay mode is changed from the low delay mode to the normal delay mode, or in a case where the delay mode indicated by the latest delay control information is a low delay mode # i and where the delay mode indicated by the previous delay control information is a low delay mode # j having shorter delay time (j>i), i.e., in a case where the delay mode is changed from the low delay mode # j to the low delay mode # i having longer delay time, the reception unit buffer monitoring section 64 shifts the operation state to the monitoring state.

In the monitoring state, similarly to the reception unit buffer monitoring section 52 in FIG. 5, the reception unit buffer monitoring section 64 estimates the reception buffer status of the buffer 44 of the reception unit 21 from the stored data-control-information sequence (history), and monitors the reception buffer status. Then, the reception unit buffer monitoring section 64 calculates, from the reception buffer status, the reproducible frame number, which is the number of reproducible frames, in a case where copying (insertion) based on the data control information is performed for the encoded data stored in the buffer 44 of the reception unit 21.

Further, the reception unit buffer monitoring section 64 compares the reproducible frame number with a threshold value predetermined as a value at which sound interruption is less likely to occur.

It is possible to adopt, as a threshold value to be compared with the reproducible frame number by the reception unit buffer monitoring section 64, for example, a fixed value such as a reference value of the normal delay mode or a value corresponding to the delay mode indicated by the latest delay control information.

It is possible to adopt, as a value corresponding to the delay mode indicated by the latest delay control information, a reference value of the accumulated amount (in the buffer 44) in the delay mode indicated by the latest delay control information. The reference value of the accumulated amount in the delay mode is the number of frames for predetermined time as appropriate time, as the delay time in the delay mode.

In the monitoring state, in a case where the reproducible frame number exceeds the threshold value, i.e., in a case where the reception buffer status is a status where sound interruption is less likely to occur, the reception unit buffer monitoring section 64 cancels the monitoring state, shifts the operation state to the normal state, and supplies the latest delay control information to the compression rate control section 65.

On the other hand, in a case where the reproducible frame number does not exceed the threshold value in the monitoring state, i.e., in a case where the reception buffer status is not a case where sound interruption is less likely to occur, the reception unit buffer monitoring section 64 keeps the operation state in the monitoring state, and supplies the delay control information supplied immediately before the delay control information supplied from the data generation section 51 immediately before shifting to the current monitoring state, to the compression rate control section 65.

It is to be noted that, in a case where the operation state is the monitoring state, when the delay mode indicated by the latest delay control information is the low delay mode (one of the low delay modes 1 to 3) and when the delay mode indicated by the previous delay control information is the normal delay mode, i.e., when the delay mode is changed from the normal delay mode to the low delay mode, or in a case where the delay mode indicated by the latest delay control information is a low delay mode # j' and where the delay mode indicated by the previous delay control information is a low delay mode # i' having longer delay time (j'>i'), i.e., when the delay mode is changed from the low delay mode # i' to the low delay mode # j' having shorter delay time, the reception unit buffer monitoring section 64 cancels the monitoring state, and shifts the operation state to the normal state, and supplies the latest delay control information to the compression rate control section 65.

Similarly to the case of the reception unit buffer monitoring section 52 in FIG. 5, by performing the above processing in the reception unit buffer monitoring section 64, it is possible to suppress the occurrence of sound interruption due to the accumulated amount in the buffer 44 of the reception unit 21 being small (the delay time being small) immediately after the delay mode is changed from the low delay mode to the normal delay mode or in a case where the delay mode is changed from the low delay mode # j to the low delay mode # i having longer delay time.

It is to be noted that, similarly to the case described with reference to the reception unit buffer monitoring section 52 in FIG. 5, it is possible for the reception unit buffer monitoring section 64 to be brought into the monitoring state where the reception buffer status of the buffer 44 of the reception unit 21 is monitored, in a case where the delay mode is changed from the low delay mode to the normal delay mode, or in a case where the low delay mode # j is changed to the low delay mode # i having longer delay time; in addition, it is possible for the reception unit buffer monitoring section 64 to be brought into the monitoring state, also in a case where the delay mode is changed from the normal delay mode to the low delay mode, or in a case where the low delay mode # i is changed to the low delay mode # j having shorter delay time.

Similarly to the compression rate control section 53 in FIG. 5, the compression rate control section 65 intermittently acquires the accumulated amount in the buffer 33, determines a compression rate in accordance with the accumulated amount in the buffer 33 and the delay mode indicated by the delay control information supplied from the reception unit buffer monitoring section 64, and supplies the compression rate to the data generation section 63.

However, the delay mode indicated by the delay control information supplied from the reception unit buffer monitoring section 64 to the compression rate control section 65 includes the low delay modes 1 to 3 for the low delay mode; the compression rate control section 65 handles the low delay modes 1 to 3 for the low delay mode. The compression rate control section 65 thus differs from the compression rate control section 53 in FIG. 5, which does not handle the low delay modes 1 to 3, in that the compression rate control section 65 handles the low delay modes 1 to 3 for the low delay mode.

For this reason, in the compression rate control section 65, for example, compression rate candidates are prepared for each of the normal delay mode and the low delay modes 1 to 3.

The compression rate control section 65 selects and determines a compression rate from among the compression rate candidates in the delay mode indicated by the delay control information supplied from the reception unit buffer monitoring section 64 in accordance with (a sequence of) the accumulated amount in the buffer 33, and supplies the compression rate to the data generation section 63.

It is possible to perform the selection of the compression rate in accordance with the accumulated amount in the buffer 33 similarly to the technique described in Japanese Unexamined Patent Application Publication No. 2016-208215, similarly to the case of the compression rate control section 53 in FIG. 5. That is, in a case where the accumulated amount in the buffer 33 is larger than the threshold value or tends to increase, a compression rate higher than the current compression rate is selected. In addition, for example, in a case where the accumulated amount in the buffer 33 tends to decrease and where the values equal to or smaller than the threshold value continue, a compression rate lower than the current compression rate is selected.

Here, immediately after the delay mode indicated by the delay control information supplied from the reception unit buffer monitoring section 64 to the compression rate control section 65 is changed, the compression rate control section 65 is able to a select compression rate from among the compression rate candidates in the delay mode after the change, similarly to the case of the compression rate control section 53 in FIG. 5. That is, the compression rate control section 65 is able to select, as the compression rate, a compression rate candidate close to the compression rate immediately before the change in the delay mode, for example, from among the compression rate candidates in the delay mode after the change. In addition, the compression rate control section 65 is able to select, as the compression rate, a compression rate candidate of which the above-described success probability is close to the case of the compression rate immediately before the change in the delay mode, for example, from among the compression rate candidates in the delay mode after the change.

It is to be noted that, in a case where the change in the delay mode indicated by the delay control information supplied from the reception unit buffer monitoring section 64 to the compression rate control section 65 is a change to the delay mode having short delay time relative to the delay time in the current delay mode, it is desirable that the compression rate control be switched in the compression rate control section 65 to allow the compression rate supplied to the data generation section 63 to be a high compression rate immediately as the delay time in the delay mode after the change becomes shorter, in order to suppress the occurrence of the sound interruption.

Similarly to the data control section 45 of FIGS. 2 and 5, the data control section 71 of the reception unit 21 performs, as control of the usage of the encoded data, insertion, discarding, or normal reading of the encoded data stored in the buffer 44 in accordance with the delay control information and the data control information supplied from the delay control information analysis section 43 and with the accumulated amount in the buffer 44.

It is to be noted that the delay mode indicated by the delay control information supplied from the delay control information analysis section 43 to the data control section 71 includes the low delay modes 1 to 3 for the low delay mode; the data control section 71 handles the low delay modes 1 to 3 for the low delay mode. The data control section 71 thus differs from the data control section 45 of FIGS. 2 and 5, which does not handle the low delay modes 1 to 3, in that the data control section 71 handles the low delay modes 1 to 3 for the low delay mode.

<Processing of Adaptation Delay Control Section 61>

FIG. 8 describes an example of processing of the adaptation delay control section 61 in FIG. 7.

The adaptation delay control section 61 selects (a low delay mode set as) an accumulated-amount-based low delay mode from among the low delay modes 1 to 3 in accordance with (a sequence of) the accumulated amount in the buffer 33.

FIG. 8 illustrates an example of selection method of how the adaptation delay control section 61 selects an accumulation-amount-based low delay mode from among the low delay modes 1 to 3 in accordance with the accumulated amount in the buffer 33.

That is, FIG. 8 illustrates a current accumulated-amount-based low delay mode (hereinafter, also referred to as a current low delay mode) and threshold values A and B to be compared with a moving average value of the accumulated amount for 0.5 seconds, for example, as statistical information of the accumulated amount (buffer state) in the buffer 33 when selecting the next accumulated-amount-based low delay mode in the current low delay mode.

In FIG. 8, the threshold values A and B in the low delay mode 1 are 0 and 1.5, respectively. Further, the threshold values A and B in the low delay mode 2 are 0 and 1.0, respectively, and the threshold values A and B in the low delay mode 3 are 0 and 0.5, respectively.

The adaptation delay control section 61 calculates a moving average value of the accumulated amount in the buffer 33 for 0.5 seconds as statistical information of the accumulated amount in the buffer 33. It is to be noted that time for the moving average value is not limited to 0.5 seconds.

The adaptation delay control section 61 compares the moving average value of the accumulated amount in the buffer 33 with the threshold values A and B of the current low delay mode; in a case where the moving average value of the accumulated amount in the buffer 33 is equal to or less than the threshold value A, the adaptation delay control section 61 selects a low delay mode # x having delay time one step shorter than the current low delay mode, as the next accumulated-amount-based low delay mode. That is, the accumulated-amount-based low delay mode is switched to the low delay mode # x having delay time one step shorter than the current low delay mode.

Thus, for example, in a case where the current low delay mode is the low delay mode 2 and where the moving average value of the accumulated amount in the buffer 33 is equal to or less than the threshold value A=0, i.e., is 0 that indicates that buffer 33 is empty, the low delay mode 3 having delay time one step shorter than the low delay mode 2 is selected as the next accumulated-amount-based low delay mode.

Further, in a case where the moving average value of the accumulated amount in the buffer 33 is equal to or more than the threshold value B, a low delay mode # y having delay time one step longer than the current low delay mode is selected as the next accumulated-amount-based low delay mode. That is, the accumulation-amount-based low delay mode is switched to the low delay mode # y having delay time one step longer than the current low delay mode.

Thus, for example, in a case where the current low delay mode is the low delay mode 2 and where the moving average value of the accumulated amount in the buffer 33 is equal to or more than the threshold value B=1.0, the low delay mode 1 having delay time one step longer than the low delay mode 2 is selected as the next accumulated-amount-based low delay mode.

On the other hand, in a case where the moving average value of the accumulated amount in the buffer 33 is larger than the threshold value A and is smaller than the threshold value B, the current low delay mode is selected as the next accumulation-amount-based low delay mode. In other words, the current low delay mode is maintained as it is.

It is to be noted that, the threshold value A in the low delay mode 3 is 0 in FIG. 8; here, there is no low delay mode having shorter delay time than the low delay mode 3. Therefore, in a case where the current low delay mode is the low delay mode 3, even when the moving average value of the accumulated amount in the buffer 33 is equal to or less than the threshold value A=0 in the low delay mode 3, the low delay mode 3, which is the current low delay mode, is maintained as it is as the accumulated-amount-based low delay mode.

In addition, the threshold value B in the low delay mode 1 is 1.5 in FIG. 8; here, there is no low delay mode having longer delay time than the low delay mode 1. Therefore, in a case where the current low delay mode is the low delay mode 1, even when the moving average value of the accumulated amount in the buffer 33 is equal to or more than the threshold value B=1.5 in the low delay mode 1, the low delay mode 1, which is the current low delay mode, is maintained as it is as the accumulated-amount-based low delay mode.

However, in a case where the current low delay mode is the low delay mode 1, when the moving average value of the accumulated amount in the buffer 33 is equal to or more than the threshold value B=1.5 in the low delay mode 1, the adaptation delay control section 61 is able to select the normal delay mode having longer delay time than the low delay mode 1, which is the current low delay mode, as the accumulated-amount-based low delay mode, and is able to supply the normal delay mode to delay control information generation section 62.

In this case, the delay control information generation section 62 supplies the delay control information indicating the normal delay mode from the adaptation delay control section 61 to the data generation section 63 regardless of the request for switching the delay mode supplied thereto.

<Processing of Compression Rate Control Section 65>

FIG. 9 describes an example of processing of the compression rate control section 65 in FIG. 7.

The compression rate control section 65 selects a compression rate from among the compression rate candidates in the delay mode indicated by the delay control information supplied from the reception unit buffer monitoring section 64 in accordance with (a sequence of) the accumulated amount in the buffer 33.

FIG. 9 illustrates examples of selection criteria A and B with which the compression rate control section 65 selects a compression rate in each of the normal delay mode and the low delay modes 1 to 3, and compression rate candidates in each of the normal delay mode and the low delay modes 1 to 3.

The selection criteria A and B include observation time in which the accumulated amount in the buffer 33 is observed, and a threshold value to be compared with the moving average value of the accumulated amount in the buffer 33 in the observation time.

In a case where the selection criterion A is satisfied, i.e., in a case where the moving average value of the accumulated amount in the buffer 33 in the observation time of the selection criterion A is equal to or less than the threshold value of the selection criterion A, a compression rate candidate which is one step lower (smaller) than the current compression rate is selected as a new compression rate from among the compression rate candidates in the current delay mode.

In a case where the selection criterion B is satisfied, i.e., in a case where the moving average value of the accumulated amount in the buffer 33 in the observation time of the selection criterion B is equal to or more than the threshold value of the selection criterion B, a compression rate candidate one step higher than the current compression rate is selected as a new compression rate from among the compression rate candidates in the current delay mode.

In a case where neither of the selection criteria A and B are satisfied, the current compression rate is maintained.

In FIG. 9, for example, in the normal delay mode, the observation time and the threshold value as the selection criterion A are one second and 0, respectively, and the observation time and the threshold value as the selection criterion B are one second and a value not equal to zero, respectively. In addition, the compression rate candidates in the normal delay mode constitute a plurality of compression rates {1/4, 1/5, 1/6, . . . } with 1/4 being the smallest compression rate.

Accordingly, in a case where the delay mode indicated by the delay control information supplied from the reception unit buffer monitoring section 64 to the compression rate control section 65 is the normal delay mode, when the moving average value of the observation time for one second of the accumulated amount in the buffer 33 is equal to or less than the threshold value 0 of the selection criterion A in the normal delay mode, i.e., when the condition of the transmission path is favorable, a compression rate candidate having one step lower than the current compression rate is selected as a new compression rate from among the compression rate candidates {1/4, 1/5, 1/6, . . . } in the normal delay mode. For example, in a case where the current compression rate is 1/5 of the compression rate candidates {1/4, 1/5, 1/6, . . . } in the normal delay mode, the compression rate candidate 1/4, which is one step lower than the current compression rate 1/5, is selected as a new compression rate.

Further, when the moving average value of the observation time for one second of the accumulated amount in the buffer 33 is other than threshold value 0 (larger than 0) of the selection criterion B in the normal delay mode, i.e., when the condition of the transmission path is not favorable, a compression rate candidate, which is one step higher than the current compression rate, is selected as a new compression rate from among the compression rate candidates {1/4, 1/5, 1/6, . . . } in the normal delay mode. For example, in a case where the current compression rate is 1/5 of the compression rate candidates {1/4, 1/5, 1/6, . . . } in the normal delay mode, the compression rate candidate 1/6, which is one step higher than the current compression rate 1/5, is selected as a new compression rate.

Referring to FIG. 9, the observation time for the accumulated amount in the buffer 33 used for determining the moving average value is set for each delay mode, and therefore, it may be said that the compression rate control section 65 changes the observation time for the accumulated amount in the buffer 33 used for determining the moving average value, in accordance with (the delay mode indicated by) the delay control information.

It is to be noted that the smallest compression rate in FIG. 9 is an example of a case where acoustic data (a sampling frequency: 44.1 kHz, number of bits of acoustic data: 16 bits) to be recorded on a CD (Compact Disc) is adopted as acoustic data to be encoded by the data generation section 63. In a case where acoustic data having a larger data amount, for example, so-called high resolution acoustic data is adopted as acoustic data to be encoded by the data generation section 63, a compression rate higher than the case of FIG. 9 is adopted as the smallest compression rate (and thus also as the compression rate candidate) in order to obtain encoded data having a size equivalent to the case of transferring acoustic data to be recorded on a CD.

<Processing of Data Control Section 71>

FIG. 10 describes an example of processing of the data control section 71 in FIG. 7.

The data control section 71 controls the insertion, discarding, or normal reading of the encoded data stored in the buffer 44 in accordance with the delay control information and the data control information supplied from the delay control information analysis section 43 and with the accumulated amount in the buffer 44.

The delay mode indicated by the delay control information supplied from the delay control information analysis section 43 to the data control section 71 includes the normal delay mode and the low delay modes 1 to 3; FIG. 10 illustrates examples of the lower limit threshold value A and the upper limit threshold value B of the accumulated amount (in the buffer 44) in the normal delay mode and the low delay modes 1 to 3, as well as the number of frames as the reference values (the number of frames for time predetermined as appropriate time, as the delay time of the respective delay modes).

Here, in the data control section 71, the lower limit threshold value A and the upper limit threshold value B are compared with a moving average value of the accumulated amount in the buffer 44 for a predetermined period of time, e.g., one second.

For example, it is now assumed that the delay mode indicated by the delay control information supplied from the delay control information analysis section 43 to the data control section 71 is the normal delay mode for a certain period of time.

In this instance, in a case where the moving average value of the accumulated amount in the buffer 44 for one second is equal to or more than the lower limit threshold value A=40 of the accumulated amount in the normal delay mode and equal to or less than upper limit threshold value B=69 of the accumulated amount in the normal delay mode, the data control section 71 performs normal reading of the encoded data for the oldest one frame stored in the buffer 44.

In addition, in a case where the moving average value of the accumulated amount in the buffer 44 for one second is larger than the upper limit threshold value B=69 of the accumulated amount in the normal delay mode, in order to reduce the accumulated amount in the buffer 44, the data control section 71 discards the encoded data stored in the buffer 44 on a frame-by-frame basis in accordance with the data control information of the encoded data, similarly to the data control section 45 in FIGS. 2 and 5.

Further, in a case where the moving average value of the accumulated amount in the buffer 44 for one second is smaller than the lower limit threshold value A=40 of the accumulated amount in the normal delay mode, in order to increase the accumulated amount in the buffer 44, the data control section 71 copies (inserts) the encoded data stored in the buffer 44 on a frame-by-frame basis in accordance with the data control information of the encoded data, similarly to the data control section 45 in FIGS. 2 and 5.

As described above, in the normal delay mode, the accumulated amount in the buffer 44 is a value near 64 (frames) which is the reference value of the accumulated amount in the normal delay mode.

Thereafter, when the delay mode indicated by the delay control information supplied from the delay control information analysis section 43 to the data control section 71 changes, for example, from the normal delay mode to the low delay mode 2, the data control section 71 switches the lower limit threshold value A and the upper limit threshold value B to be compared with the moving average value of the accumulated amount in the buffer 44 for one second to the lower limit threshold value A=16 and the upper limit threshold value B=20 of the accumulated amount in the low delay mode 2.

Immediately after the delay mode indicated by the delay control information supplied from the delay control information analysis section 43 to the data control section 71 changes from the normal delay mode to the low delay mode 2, the accumulated amount in the buffer 44 is a value near 64 which is the reference value of the accumulated amount in the normal delay mode.

Accordingly, immediately after the delay mode indicated by the delay control information supplied from the delay control information analysis section 43 to the data control section 71 changes from the normal delay mode to the low delay mode 2, the moving average value (around 64) of the accumulated amount in the buffer 44 for one second is larger than the upper limit threshold value B=20 of the accumulated amount in the low delay mode 2. Therefore, in the data control section 71, the encoded data stored in the buffer 44 is discarded on a frame-by-frame basis in accordance with the data control information of the encoded data, in order to reduce the accumulated amount in the buffer 44. The discarding of the encoded data is continued until the accumulated amount in the buffer 44 reaches 18 which is a reference value of the accumulated amount in the low delay mode 2.

Thereafter, when the delay mode indicated by the delay control information supplied from the delay control information analysis section 43 to the data control section 71 changes, for example, from the low delay mode 2 to the normal delay mode, the data control section 71 switches the lower limit threshold value A and the upper limit threshold value B to be compared with the moving average value of the accumulated amount in the buffer 44 for one second to the lower limit threshold value A=40 and the upper limit threshold value B=69 of the accumulated amount in the normal delay mode.

Immediately after the delay mode indicated by the delay control information supplied from the delay control information analysis section 43 to the data control section 71 changes from the low delay mode 2 to the normal delay mode, the accumulated amount in the buffer 44 is a value near 18 which is the reference value of the accumulated amount in the low delay mode 2.

Accordingly, immediately after the delay mode indicated by the delay control information supplied from the delay control information analysis section 43 to the data control section 71 changes from the low delay mode 2 to the normal delay mode, the moving average value (near 18) of the accumulated amount in the buffer 44 for one second is smaller than the lower limit threshold value A=40 of the accumulated amount in the normal delay mode. Therefore, in the data control section 71, the encoded data stored in the buffer 44 is copied (inserted) on a frame-by-frame basis in accordance with the data control information of the encoded data, in order to increase the accumulated amount in the buffer 44. The copying of the encoded data is continued until the accumulated amount in the buffer 44 reaches 64 which is the reference value of the accumulated amount in the normal delay mode.

<Transmission Processing>

FIG. 11 is a flow chart describing an example of transmission processing performed by the transmission unit 12 in FIG. 7 for transmitting acoustic data.

In step S81, the adaptation delay control section 61 selects an accumulated-amount-based low delay mode from among the low delay modes 1 to 3 in accordance with the accumulated amount in the buffer 33, supplies the accumulated-amount-based low delay mode to the delay control information generation section 62, and the processing proceeds to step S82.

Here, the delay control information generation section 62 generates delay control information indicating the low delay mode or the normal delay mode in response to a request for switching the delay mode supplied thereto.

Then, in a case where the delay mode indicated by the delay control information is the normal delay mode, the delay control information generation section 62 supplies the delay control information indicating the normal delay mode as it is to the data generation section 63. In addition, in a case where the delay mode indicated by the delay control information is the low delay mode, the delay control information generation section 62 changes the low delay mode indicated by the delay control information to an accumulated-amount-based low delay mode (low delay mode 1, 2, or 3) supplied from the adaptation delay control section 61, and supplies the delay control information after the change to the data generation section 63. The data generation section 63 supplies the delay control information from the delay control information generation section 62 to the reception unit buffer monitoring section 64.

In step S82, similarly to step S51 in FIG. 6, the reception unit buffer monitoring section 64 checks whether or not the delay mode indicated by the latest delay control information supplied from the data generation section 63 has been changed from the delay mode indicated by the previous delay control information, i.e., whether or not there has been a change in the delay mode, and the processing proceeds to step S83.

In step S83, the reception unit buffer monitoring section 64 determines whether or not the change in the delay mode satisfies the monitoring state shifting condition for shifting the operation state to the monitoring state. Here, it is possible to adopt, as the monitoring state shifting condition in step S83, the delay mode indicated by the delay control information having been changed from the low delay mode to the normal delay mode, and the delay mode having been changed from the low delay mode # j to the low delay mode # i having longer delay time (j>i).

In a case where it is determined in step S83 that the monitoring state shifting condition is satisfied, the processing proceeds to step S84.

In step S84, similarly to step S53 in FIG. 6, in a case where the operation state is the normal state, the reception unit buffer monitoring section 64 shifts the operation state from the normal state to the monitoring state, starts monitoring the reception buffer status, and the processing proceeds to step S85.

In step S85, similarly to step S54 in FIG. 6, the reception unit buffer monitoring section 64 calculates the reproducible frame number from the reception buffer status, and the processing proceeds to step S86.

In step S86, the reception unit buffer monitoring section 64 determines whether or not the reproducible frame number is less than a threshold value predetermined as a value at which sound interruption is less likely to occur. Here, as the threshold value for the determination in step S86, a value that differs for each delay mode indicated by the delay control information supplied from the data generation section 63 to the reception unit buffer monitoring section 64, i.e., for example, a reference value of the accumulated amount in the delay mode (FIG. 10) is adopted.

In a case where it is determined in step S86 that the reproducible frame number is not less than the threshold value, i.e., in a case where the reception buffer status is a status where sound interruption is less likely to occur, the processing proceeds to step S90.

In addition, in a case where it is determined in step S86 that the reproducible frame number is less than the threshold value, i.e., in a case where the reception buffer status is not a status where sound interruption is less likely to occur, the processing proceeds to step S87.

In step S87, the reception unit buffer monitoring section 64 sets (changes) the latest delay control information from the data generation section 63 to the delay control information supplied immediately before the delay control information supplied from the data generation section 63 immediately before the monitoring state, supplies the set (changed) delay control information to the compression rate control section 65, and the processing proceeds to step S91.

On the other hand, in a case where it is determined in step S83 that the monitoring state shifting condition is not satisfied, the processing proceeds to step S88.

In step S88, the reception unit buffer monitoring section 64 determines whether or not the operation state is the monitoring state, similarly to step S57 in FIG. 6.

In a case where it is determined in step S88 that the operation state is not the monitoring state, i.e., in a case where the operation state is the normal state, the reception unit buffer monitoring section 64 supplies the delay control information from the data generation section 63 to the compression rate control section 65, and the processing skips steps S89 and S90 and proceeds to step S91.

In addition, in a case where it is determined in step S88 that the operation state is the monitoring state, the processing proceeds to step S89.

In step S89, the reception unit buffer monitoring section 64 cancels the monitoring state, and determines whether or not the monitoring state cancellation condition for shifting the operation state to the normal state is satisfied. Here, it is possible to adopt, as the monitoring state cancellation condition in step S89, the delay mode indicated by the delay control information having been changed from the normal delay mode to the low delay mode (one of low delay modes 1 to 3), and the delay mode having been changed from the low delay mode # i' to the low delay mode # j' having shorter delay time (j'>i').

In a case where it is determined in step S89 that the monitoring state cancellation condition is not satisfied, the processing proceeds to step S85; hereinafter, the above-described processing is performed.

In addition, in a case where it is determined in step S89 that the monitoring state cancellation condition is satisfied, the processing proceeds to step S90, where the reception unit buffer monitoring section 64 cancels the monitoring state, and shifts the operation state to the normal state. Further, the reception unit buffer monitoring section 64 supplies the latest delay control information from the data generation section 63 to the compression rate control section 65, and the processing proceeds from step S90 to step S91.

In step S91, in accordance with the delay control information supplied from the reception unit buffer monitoring section 64 to the compression rate control section 65, the compression rate control section 65 sets the compression rate candidate in the delay mode indicated by the delay control information as the compression rate candidate of interest which is the compression rate candidate used for the control of the compression rate, i.e., sets the compression rate candidate of any one of the normal delay mode and the low delay modes 1 to 3 as the compression rate candidate of interest, and the processing proceeds to step S92.

In step S92, the compression rate control section 65 selects a compression rate from among the compression rate candidates of interest, out of the compression rate candidates in the normal delay mode and the low delay modes 1 to 3, in accordance with the accumulated amount in the buffer 33, as described with reference to FIG. 9, and supplies the selected compression rate to the data generation section 63 to thereby control the compression rate in the data generation section 63, and the processing proceeds to step S93.

In step S93, the data generation section 63 encodes frames of acoustic data supplied from the supply unit 11 using the compression rate supplied from the compression rate control section 65, and the processing proceeds to step S94.

In step S94, similarly to step S12 in FIG. 2, the data generation section 63 determines the SF or the tonality as the sensed feature amount of the frame of interest which is the frame of the acoustic data encoded immediately before, and the processing proceeds to step S95.

In step S95, similarly to step S13 in FIG. 2, the data generation section 63 generates data control information for the encoded data of the frame of interest in accordance with the sensed feature amount of the frame of interest. Then, the data generation section 63 supplies the data control information to the reception unit buffer monitoring section 64, and the processing proceeds from step S95 to step S96.

In step S96, similarly to step S65 in FIG. 6, the reception unit buffer monitoring section 64 causes the unillustrated FIFO to store the data control information supplied from the data generation section 63 in step S95 performed immediately before, and the processing proceeds to step S97.

In steps S97 to S99, pieces of processing similar to the cases of steps S14 to S16 in FIG. 2 are performed, respectively.

It is to be noted that the pieces of processing of steps S81 to S99 are performed in a pipeline as necessary.

Here, in the reception processing performed by the reception unit 21 in FIG. 7, there are the normal delay mode and the low delay modes 1 to 3 in the delay mode indicated by the delay control information supplied from the delay control information analysis section 43 to the data control section 71. In accordance with any one of the normal delay mode and the low delay modes 1 to 3 which are indicated by the delay control information supplied from the delay control information analysis section 43, the data control section 71 sets the lower limit threshold value A and the upper limit threshold value B (FIG. 10) of the accumulated amount in the delay mode, and controls the insertion, discarding, and normal reading of the encoded data stored in the buffer 44 in accordance with the accumulated amount in the buffer 44 and the data control information. Other than those described above, processing similar to the case of FIG. 4 is performed; therefore, the description thereof is omitted.

In the transmission unit 12 and the reception unit 21 in FIG. 7, similarly to the case of FIG. 5, it is possible to easily perform the switching of the delay time of the acoustic data in the reception unit 21 without disconnecting the wireless communication. In addition, it is also possible to appropriately control the compression rate in accordance with the delay mode and the condition of the transmission path to suppress the occurrence of the sound interruption, and it is also possible to enhance the sound quality of the acoustic outputted from the output unit 22 in a case where the condition of the transmission path is favorable.

Accordingly, for example, in a case where an audio content stored in a smartphone is transmitted and reproduced by wireless communication using Bluetooth (registered trademark), when the reproduction is switched to a video content accompanied by images and acoustics, it is possible to achieve setting of the delay mode to the normal delay mode in which the reproduction is stabilized during the reproduction of the audio content as well as switching of the delay mode to the low delay mode during the reproduction of the video content to allow for less out of sync between the image and the accompanying acoustic, without reconnecting the couplings between the transmission side and the reception side and without an operation of a user.

Further, it is possible to automatically optimally adjust the compression rate in accordance with the condition of the transmission path, thus enabling the user to enjoy the video content and the audio content at ease without being aware of the condition of the transmission path on the spot, with appropriate delay time and better sound quality.

<Description of Computer to which the Technology is Applied>

Next, a series of processing described above may be performed by hardware or software. In a case where the series of processing is performed by software, a program constituting the software is installed in a general-purpose computer, or the like.

FIG. 12 is a block diagram illustrating a configuration example of an embodiment of a computer in which the program is installed that executes the series of processing described above.

The program may be recorded in advance in a hard disk 105 or a ROM 103 as a recording medium built in the computer.

Alternatively, the program may be stored (recorded) in a removable recording medium 111. Such a removable recording medium 111 may be provided as so-called packaging software. Here, examples of the removable recording medium 111 may include a flexible disk, a CD-ROM (Compact Disc Read Only Memory, an MO (Magneto Optical) disk, a DVD (Digital Versatile Disc), a magnetic disk, and a semiconductor memory.

It is to be noted that the program may be downloaded to the computer via a communication network or a broadcasting network and installed in the built-in hard disk 105, in addition to being installed in the computer from the removable recording medium 111 as described above. That is, the program may be wirelessly transferred from, for example, a downloading site to the computer via an artificial satellite for digital satellite broadcasting, or may be transferred by wire to the computer via a network such as a LAN (Local Area Network) or the Internet.

The computer includes a built-in CPU (Central Processing Unit) 102; an input/output interface 110 is coupled to the CPU 102 via a bus 101.

When a command is inputted by an operation, etc. of the input unit 107 performed by the user via the input/output interface 110, the CPU 102 executes the program stored in the ROM (Read Only Memory) 103 in accordance with the command. Alternatively, the CPU 102 loads the program stored in the hard disk 105 into a RAM (Random Access Memory) 104 to execute the program.

As a result, the CPU 102 performs the processing in accordance with the above-described flowchart or the processing to be performed by the above-described configuration in the block diagram. Then, the CPU 102 outputs processing results thereof, as necessary, from an output unit 106 or transmits the processing results from a communication unit 108 via, for example, the input/output interface 110, and further causes the hard disk 105 to perform recording, etc. of the processing result.

It is to be noted that the input unit 107 is configured by a keyboard, a mouse, a microphone, and the like. In addition, the output unit 106 is configured by an LCD (Liquid Crystal Display), a speaker, and the like.

Here, in the present specification, the processing performed by the computer in accordance with the program does not necessarily have to be performed in time series in the order described as the flowchart. That is, the processing performed by the computer in accordance with the program includes processing executed in parallel or separately (e.g., parallel processing or processing by objects).

In addition, the program may be processed by one computer (processor), or may be subjected to distributed processing by a plurality of computers. Further, the program may be transferred to a remote computer to be executed.

Further, in the present specification, the system means a set of a plurality of components (units, modules (parts), etc.), and there is no limitation as to whether or not all the components are in the same housing. Thus, a plurality of units housed in separate housings and coupled via a network and one apparatus in which a plurality of modules housed in one housing are each a system.

It is to be noted that an embodiment of the present technology is not limited to the embodiment described above, and may be modified in a wide variety of ways without departing from the gist of the present technology.

For example, the present technology may have a configuration of cloud computing in which one function is shared and processed jointly by a plurality of units via a network.

In addition, each step described in the above-described flowchart may be shared and executed by a plurality of units, in addition to being performed by one apparatus.

Further, in a case where a plurality of pieces of processing are included in one step, the plurality of pieces of processing included in the one step may be shared and executed by a plurality of units, in addition to being executed by one apparatus.

In addition, the effects described in the present specification are merely illustrative and not limiting, and other effects may be provided.

It is to be noted that the present technology may have the following configuration.

<1>
A reception unit including:
a reception section that receives
data transmitted by wireless communication,
data control information, transmitted by wireless communication, for controlling of a usage of the data, and
delay control information, transmitted by wireless communication, indicating a delay mode regarding delay time when the data is processed;
a data control section that controls the usage of the data in accordance with the data control information and the delay control information; and
a data output section that outputs data of which the usage is controlled.

<2>
The reception unit according to <1>, in which the data control information includes information regarding permission or prohibition of insertion of data, discarding of data, or both of the insertion or the discarding of the data.

<3>
The reception unit according to <2>, further including a buffer that buffers the data, in which
the data control section controls insertion and discarding of the data buffered by the buffer in accordance with the delay control information, the data control information, and an accumulated amount in the buffer.

<4>
The reception unit according to <3>, in which
the data control section
sets a threshold value to be compared with the accumulated amount in the buffer in accordance with the delay control information, and
controls the insertion and the discarding of the data buffered by the buffer in accordance with a result of the comparison between the accumulated amount in the buffer and the threshold value.

<5>
A reception method including:
receiving
data transmitted by wireless communication,
data control information, transmitted by wireless communication, for controlling of a usage of the data, and
delay control information, transmitted by wireless communication, indicating a delay mode regarding delay time when the data is processed;
controlling the usage of the data in accordance with the data control information and the delay control information; and
outputting data of which the usage is controlled.

<6>
A program that causes a computer to serve as:
a reception section that receives
data transmitted by wireless communication,
data control information, transmitted by wireless communication, for controlling of a usage of the data, and
delay control information, transmitted by wireless communication, indicating a delay mode regarding delay time when the data is processed;
a data control section that controls the usage of the data in accordance with the data control information and the delay control information; and
a data output section that outputs data of which the usage is controlled.

<7>
A transmission unit including:
a data control information generation section that generates data control information for controlling of a usage of data in a reception unit that receives the data transmitted by wireless communication;
a delay control information generation section that generates delay control information indicating a delay mode regarding delay time when the data is processed in the reception unit; and
a transmission section that transmits the data, the data control information, and the delay control information by wireless communication.

<8>
The transmission unit according to <7>, in which the data control information includes information regarding permission or prohibition of insertion of data, discarding of data, or both of the insertion and the discarding of the data in the reception unit.

<9>
The transmission unit according to <8>, in which the data control information generation section generates the data control information on a basis of a sensed feature amount indicating a degree in which the insertion or the discarding of the data is sensed in a case where the insertion or the discarding of the data is performed in the reception unit.

<10>
The transmission unit according to <8> or <9>, further including:
an encoding section that encodes the data at a predetermined compression rate; and
a compression rate control section that controls the compression rate in the encoding of the data in accordance with the delay control information.

<11>
The transmission unit according to <10>, further including a transmission buffer that buffers encoded data obtained by the encoding of the data, in which the compression rate control section controls the compression rate in accordance with the delay control information and an accumulated amount in the transmission buffer.

<12>

The transmission unit according to <10> or <11>, in which the reception unit buffers the data in a reception buffer, and controls insertion and discarding of the data buffered in the reception buffer in accordance with the delay control information, the data control information, and an accumulated amount in the reception buffer, the delay mode indicated by the delay control information includes a first delay mode and a second delay mode having shorter delay time than the first delay mode, and the transmission unit further includes a timing control section that acquires a reception buffer status which is a status of the reception buffer, and, in a case where the delay mode indicated by the delay control information is changed from the second delay mode to the first delay mode, controls a timing of the control of the compression rate by the compression rate control section in accordance with the reception buffer status.

<13>

The transmission unit according to <11> or <12>, in which the delay control information generation section changes the delay time in the delay mode indicated by the delay control information in accordance with the accumulated amount in the transmission buffer.

<14>

The transmission unit according to <12>, in which the delay mode indicated by the delay control information includes a first delay mode and a second delay mode having shorter delay time than the first delay mode, and the delay control information generation section changes the delay time of the second delay mode in accordance with the accumulated amount in the transmission buffer.

<15>

The transmission unit according to any one of <11> to <14>, in which the compression rate control section controls the compression rate in accordance with the delay control information and the accumulated amount in the transmission buffer within predetermined observation time, and the compression rate control section changes the observation time in accordance with the delay control information.

<16>

A transmission method including:

generating data control information for controlling of a usage of data in a reception unit that receives the data transmitted by wireless communication;

generating delay control information indicating a delay mode regarding delay time when the data is processed in the reception unit; and transmitting the data, the data control information, and the delay control information by wireless communication.

<17>

A program that causes a computer to serve as:

a data control information generation section that generates data control information for controlling of a usage of data in a reception unit that receives the data transmitted by wireless communication, a delay control information generation section that generates delay control information indicating a delay mode regarding delay time when the data is processed in the reception unit, and a transmission section that transmits the data, the data control information, and the delay control information by wireless communication.

REFERENCE NUMERALS LIST 10 transmission apparatus
11 supply unit
12 transmission unit
20 reception apparatus
21 reception unit
22 output unit
31 delay control information generation section
32 data generation section
33 buffer
34 packetization section
35, 41 communication section
42 packet division section
43 delay control information analysis section
44 buffer
45 data control section
46 data output section
47 LPCM buffer
51 data generation section
52 reception unit buffer monitoring section
53 compression rate control section
61 adaptation delay control section
62 delay control information generation section
63 data generation section
64 reception unit buffer monitoring section
65 compression rate control section
71 data control section
101 bus
102 CPU
103 ROM
104 RAM
105 hard disk
106 output unit
107 input unit
108 communication unit
109 drive
110 input/output interface
111 removable recording medium

The invention claimed is:

1. A reception unit comprising:
processing circuitry configured to:
receive:
data transmitted by wireless communication,
data control information, transmitted by wireless communication, for controlling of a usage of the data, and
delay control information, transmitted by wireless communication, indicating a delay mode regarding delay time when the data is processed;
control the usage of the data in accordance with the data control information and the delay control information; and
output the data of which the usage is controlled, wherein the data control information received with the data comprises information regarding permission or prohibition of insertion of data, discarding of data, or both of the insertion and the discarding of the data and wherein the data control information received with the data is based on a sensed feature amount indicating a degree in which the insertion or the discarding of the data is sensed in a case where the insertion or the discarding of the data is performed in the reception unit.

2. The reception unit according to claim 1, further comprising a buffer that buffers the data, wherein
the processing circuitry is configured to control insertion and discarding of the data buffered by the buffer in accordance with the delay control information, the data control information, and an accumulated amount in the buffer.

3. The reception unit according to claim 2, wherein
the processing circuitry is configured to:
set a threshold value to be compared with the accumulated amount in the buffer in accordance with the delay control information, and
control the insertion and the discarding of the data buffered by the buffer in accordance with a result of the comparison between the accumulated amount in the buffer and the threshold value.

4. A reception method comprising:
receiving:
data transmitted by wireless communication,
data control information, transmitted by wireless communication, for controlling of a usage of the data, and
delay control information, transmitted by wireless communication, indicating a delay mode regarding delay time when the data is processed;
controlling the usage of the data in accordance with the data control information and the delay control information; and
outputting the data of which the usage is controlled, wherein the data control information received with the data comprises information regarding permission or prohibition of insertion of data, discarding of data, or both of the insertion and the discarding of the data and wherein the data control information received with the data is based on a sensed feature amount indicating a degree in which the insertion or the discarding of the data is sensed in a case where the insertion or the discarding of the data is performed.

5. A non-transitory computer readable medium containing instructions that, when executed by processing circuitry, perform a reception method comprising:
receiving:
data transmitted by wireless communication,
data control information, transmitted by wireless communication, for controlling of a usage of the data, and
delay control information, transmitted by wireless communication, indicating a delay mode regarding delay time when the data is processed;
controlling the usage of the data in accordance with the data control information and the delay control information; and
outputting the data of which the usage is controlled, wherein the data control information received with the data comprises information regarding permission or prohibition of insertion of data, discarding of data, or both of the insertion and the discarding of the data and wherein the data control information received with the data is based on a sensed feature amount indicating a degree in which the insertion or the discarding of the data is sensed in a case where the insertion or the discarding of the data is performed.

6. A transmission unit comprising:
processing circuitry configured to:
generate data control information for controlling of a usage of data in a reception unit that receives the data transmitted by wireless communication;
generate delay control information indicating a delay mode regarding delay time when the data is processed in the reception unit; and
transmit the data, the data control information, and the delay control information by wireless communication, wherein the data control information transmitted with the data comprises information regarding permission or prohibition of insertion of data, discarding of data, or both of the insertion and the discarding of the data in the reception unit and wherein the processing circuitry is configured to generate the data control information on a basis of a sensed feature amount indicating a degree in which the insertion or the discarding of the data is sensed in a case where the insertion or the discarding of the data is performed in the reception unit.

7. The transmission unit according to claim 6, wherein the processing circuitry is further configured to:
encode the data at a predetermined compression rate; and
control the compression rate in the encoding of the data in accordance with the delay control information.

8. The transmission unit according to claim 7, further comprising a transmission buffer that buffers encoded data obtained by the encoding of the data, wherein
the processing circuitry is configured to control the compression rate in accordance with the delay control information and an accumulated amount in the transmission buffer.

9. The transmission unit according to claim 7, wherein
the reception unit buffers the data in a reception buffer, and controls insertion and discarding of the data buffered in the reception buffer in accordance with the delay control information, the data control information, and an accumulated amount in the reception buffer,
the delay mode indicated by the delay control information includes a first delay mode and a second delay mode having shorter delay time than the first delay mode, and
the processing circuitry is further configured to acquire a reception buffer status which is a status of the reception buffer, and, in a case where the delay mode indicated by the delay control information is changed from the second delay mode to the first delay mode, control a timing of the control of the compression rate by the compression rate control section in accordance with the reception buffer status.

10. The transmission unit according to claim 8, wherein the processing circuitry is configured to change the delay time in the delay mode indicated by the delay control information in accordance with the accumulated amount in the transmission buffer.

11. The transmission unit according to claim 10, wherein
the delay mode indicated by the delay control information includes a first delay mode and a second delay mode having shorter delay time than the first delay mode, and
the processing circuitry is configured to change the delay time of the second delay mode in accordance with the accumulated amount in the transmission buffer.

12. The transmission unit according to claim 8, wherein
the processing circuitry is configured to control the compression rate in accordance with the delay control information and the accumulated amount in the transmission buffer within predetermined observation time, and
change the observation time in accordance with the delay control information.

13. A transmission method comprising:
generating data control information for controlling of a usage of data in a reception unit that receives the data transmitted by wireless communication;
generating delay control information indicating a delay mode regarding delay time when the data is processed in the reception unit; and
transmitting the data, the data control information, and the delay control information by wireless communication, wherein the data control information transmitted with the data comprises information regarding permission or prohibition of insertion of data, discarding of data, or both of the insertion and the discarding of the data in the reception unit and wherein the data control information is generated based on a sensed feature amount indicating a degree in which the insertion or the discarding of the data is sensed in a case where the insertion or the discarding of the data is performed in the reception unit.

14. A non-transitory computer readable medium containing instructions that, when executed by processing circuitry, perform a transmission method comprising:
generating data control information for controlling of a usage of data in a reception unit that receives the data transmitted by wireless communication,
generating delay control information indicating a delay mode regarding delay time when the data is processed in the reception unit, and
transmitting the data, the data control information, and the delay control information by wireless communication, wherein the data control information transmitted with the data comprises information regarding permission or prohibition of insertion of data, discarding of data, or both of the insertion and the discarding of the data in the reception unit and wherein the data control information is generated based on a sensed feature amount indicating a degree in which the insertion or the discarding of the data is sensed in a case where the insertion or the discarding of the data is performed in the reception unit.

\* \* \* \* \*